(12) United States Patent
Tolomei et al.

(10) Patent No.: US 11,157,836 B2
(45) Date of Patent: Oct. 26, 2021

(54) CHANGING MACHINE LEARNING CLASSIFICATION OF DIGITAL CONTENT

(71) Applicant: Oath Inc., New York, NY (US)

(72) Inventors: Gabriele Tolomei, London (GB); Andy Haines, London (GB); Mounia Lalmas, London (GB); Fabrizio Silvestri, London (GB)

(73) Assignee: VERIZON MEDIA INC., New York, NY (US)

( * ) Notice: Subject to any disclaimer, the term of this patent is extended or adjusted under 35 U.S.C. 154(b) by 757 days.

(21) Appl. No.: 15/444,912

(22) Filed: Feb. 28, 2017

(65) Prior Publication Data

US 2018/0247222 A1 Aug. 30, 2018

(51) Int. Cl.
*G06N 20/20* (2019.01)
*H04L 29/08* (2006.01)
*G06Q 30/02* (2012.01)
*G06N 20/00* (2019.01)
*G06N 5/00* (2006.01)

(52) U.S. Cl.
CPC ............ *G06N 20/20* (2019.01); *G06N 5/003* (2013.01); *G06N 20/00* (2019.01); *G06Q 30/0242* (2013.01); *H04L 67/02* (2013.01); *H04L 67/22* (2013.01)

(58) Field of Classification Search
CPC ........ G06N 20/00; G06N 20/10; G06N 20/20; G06N 5/00; G06N 5/003; G06Q 30/0242; H04L 67/02; H04L 67/22
USPC .......................................................... 706/11
See application file for complete search history.

(56) References Cited

U.S. PATENT DOCUMENTS

| 10,534,851 | B1* | 1/2020 | Chan ................. G06Q 30/0255 |
| 2009/0037355 | A1* | 2/2009 | Brave ................. G06F 16/9535 706/45 |
| 2014/0105488 | A1* | 4/2014 | Geng .................... G06F 16/951 382/161 |
| 2014/0164521 | A1* | 6/2014 | Tiu ...................... G06F 16/9535 709/204 |
| 2015/0213389 | A1* | 7/2015 | Modarresi ........ G06Q 10/06393 705/7.39 |
| 2017/0154356 | A1* | 6/2017 | Trevisiol ............ G06Q 30/0246 |
| 2017/0178179 | A1* | 6/2017 | Bauman ............. G06Q 30/0244 |

OTHER PUBLICATIONS

Kincaid, J.P., R.P. Fishburn, R. Rogers, and B. Chissom. "Derivation of new readability formulas for Navy enlisted personnel (Research Branch Report 8-75)", Memphis, TN: Naval Air Station, Millington, Tennessee (1975): 40.

(Continued)

*Primary Examiner* — Shane D Woolwine
(74) *Attorney, Agent, or Firm* — Cooper Legal Group, LLC

(57) ABSTRACT

Briefly, example methods, apparatuses, and/or articles of manufacture are disclosed that may be implemented, in whole or in part, using one or more computing devices to facilitate and/or support one or more operations and/or techniques for changing a classification of a landing page, such as via, for example, identifying features of the landing page, such as to predict a binary classification of the landing page as to post-click user experience. One or more adjustments to features of the landing page may be determined, such as using a machine learning approach, by way of non-limiting example.

21 Claims, 6 Drawing Sheets

200

Identify features to predict a binary classification of a landing page
202

Determine one or more feature adjustments to change landing page classification
204

(56) References Cited

OTHER PUBLICATIONS

Morisita, Masaaki. "Measuring of interspecific association and similarity between communities", Mem. Fac. Sci. Kyushu Univ. Series E3 (1959): 65-80.

Neyman, Jerzy, "On the two different aspects of the representative method: the method of stratified sampling and the method of purposive selection" Journal of the Royal Statistical Society 97, No. 4 (1934): 558-625.

Lindley, Dennis V. and Adrian FM Smith, "Bayes estimates for the linear model" Journal of the Royal Statistical Society. Series B (Methodological) (1972): 1-41.

Zhang, Ping, "Model Selection Via Multifold Cross Validation", The Annals of Statistics 21, No. 1 (1993): 299-313.

David M. Diez, Christopher D. Barr, and Mine Cetinkaya-Rundel, "OpenIntro Statistics" (3d ed. 2015): 129-130.

B. W. Matthews, "Comparison of the Predicted and Observed Secondary Structure of T4 Phage Lysozyme", May 21, 1975, pp. 442-451, 10 pgs.

Barbieri, et. al., "Improving Post-Click User Engagement on Native Ads via Survival Analysis", WWW 2016, Apr. 11-15, 2016, Montreal Quebec, Canada ACM 978-1-4503-4143-1/16/04, 10 pgs.

Lalmas, et. al., "Promoting Positive Post-Click Experience for In-Stream Yahoo Gemini Users", KDD' 15, Aug. 10-13, 2015, Sydney, NSW, Australia, 10 pgs.

Tolomei, et. al., "A Data-driven Methodology to Detect Accidental Clicks on Homerun iOS App", Yahoo IDF ID15-11139, Mar. 17, 2015, 12 pgs.

Farahat, et. al., "A System and Method for Mobile Advertising Supply Discounting", Yahoo IDF ID15-11135, Jan. 2015, 6 pgs.

Zhou, et. al., "Predicting Pre-click Quality for Native Advertisements" WWW 2016, Apr. 11-15, 2016, Montreal, Quebec, Canada, ACM 978-1-4503-4143-1/16/04, 12 pgs.

\* cited by examiner

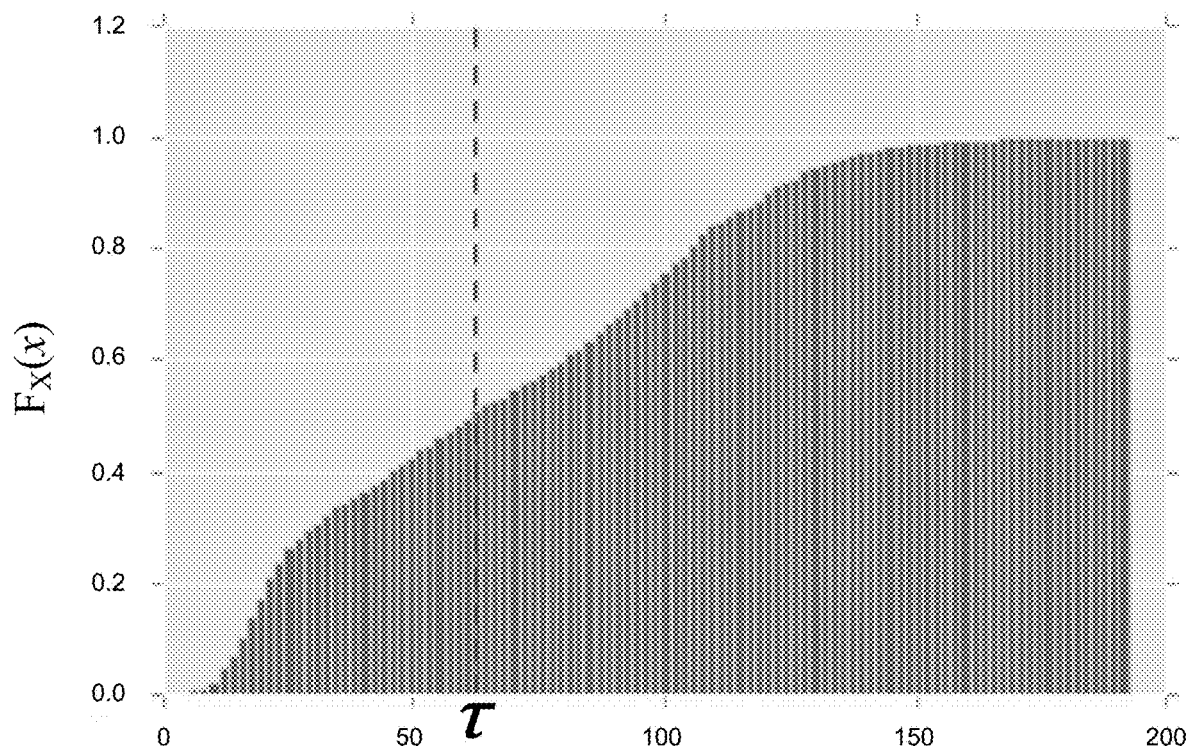
FIG. 3  $X = $ avg. dwell time (secs.)
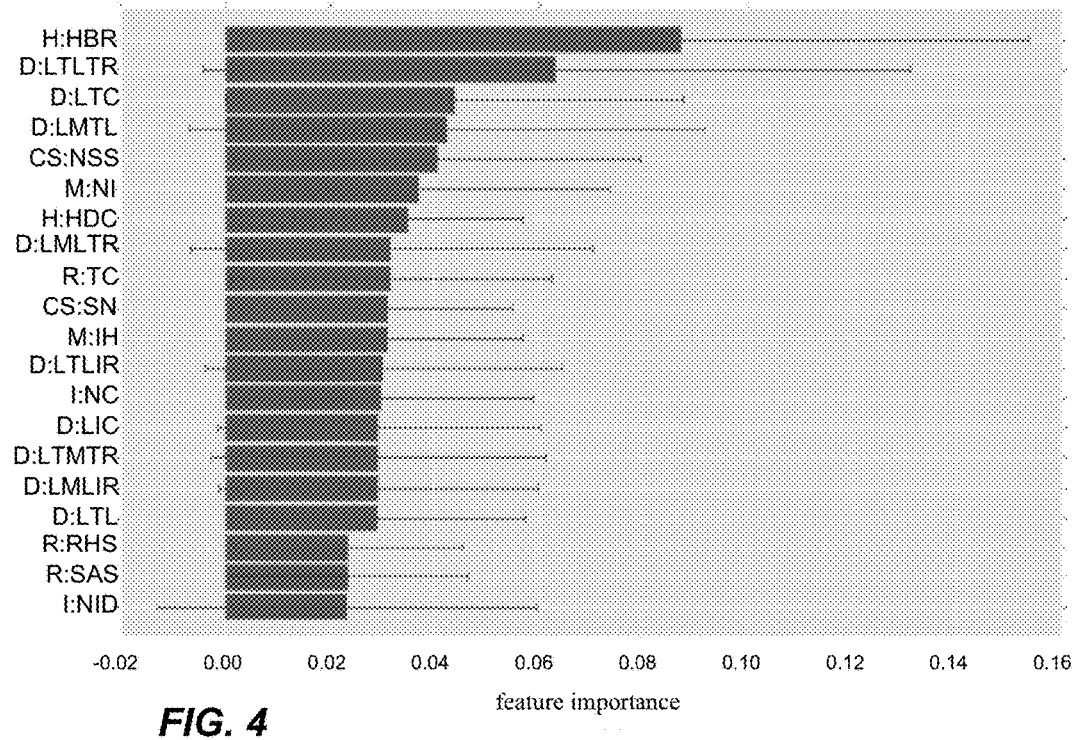
FIG. 4

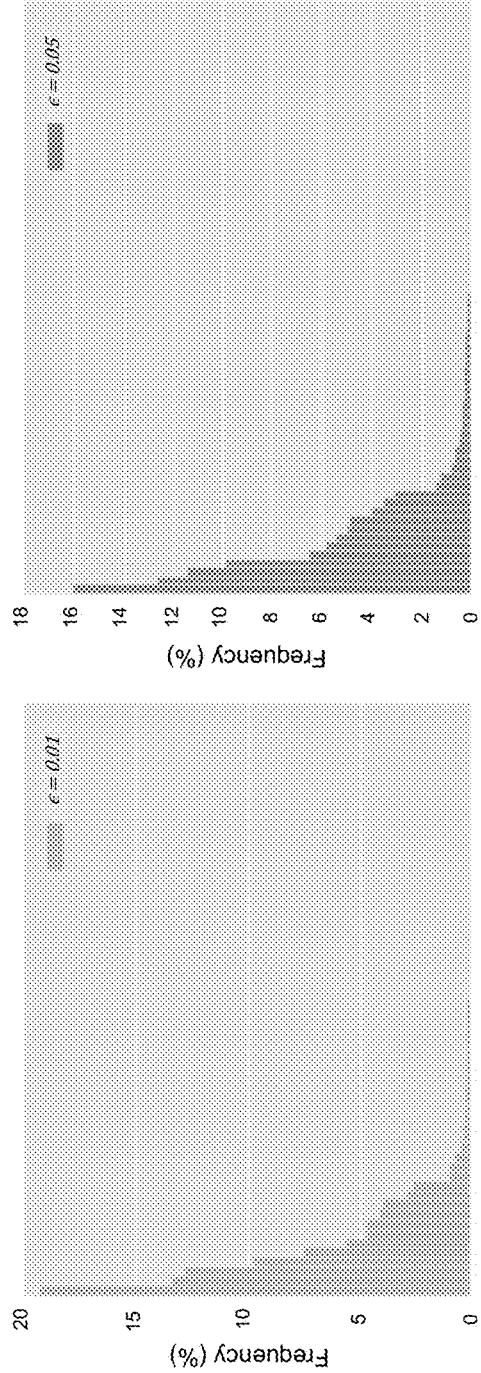
FIG. 5(a)
FIG. 5(b)
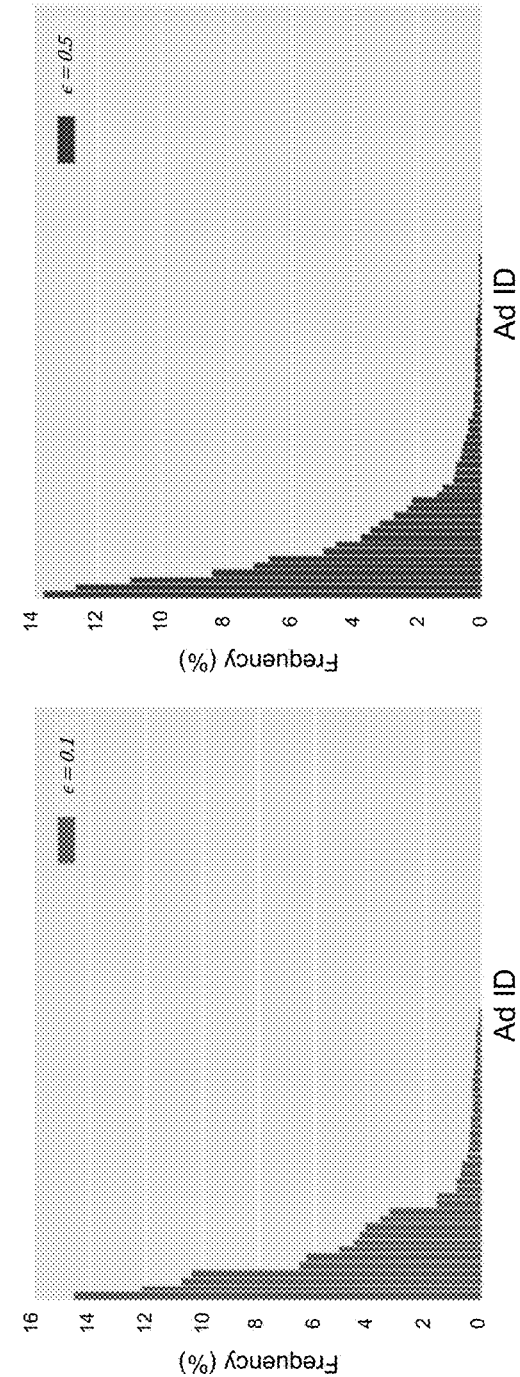
FIG. 5(c)
FIG. 5(d)

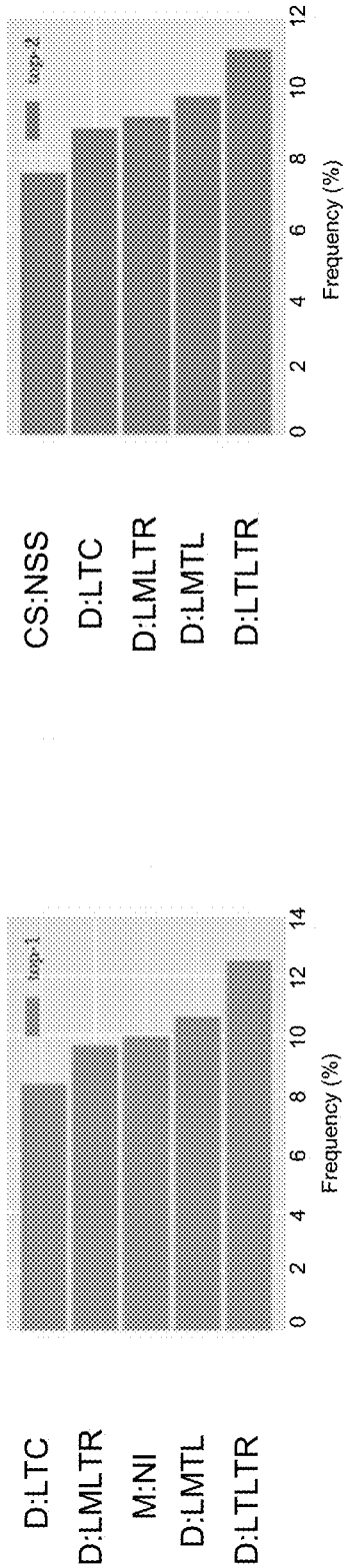
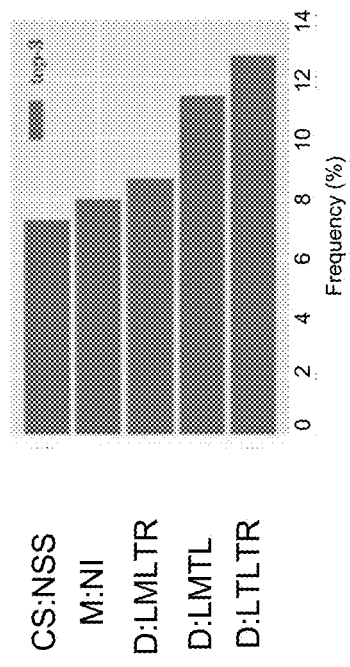
FIG. 7(a)
FIG. 7(b)
FIG. 7(c)

CHANGING MACHINE LEARNING CLASSIFICATION OF DIGITAL CONTENT

FIELD

This disclosure relates generally to digital content processing and, more particularly, to changing machine learning (ML) classification of digital content, such as via one or more adjustments to one or more features of digital content, for example.

INFORMATION

The Internet is widespread. The World Wide Web or simply the Web, provided by the Internet, is growing rapidly, at least in part, from the large amount of digital content being added seemingly on a daily basis. A wide variety of digital content in the form of stored signals, such as, for example, web pages, text documents, images, audio files, video files, or the like is continually being identified, located, retrieved, accumulated, stored, or communicated. With a large amount of digital content being available and/or accessible over the Internet, a number of tools and/or services may often be provided to users so as to allow for copious amounts of digital content to be searched in an efficient and/or effective manner. For example, service providers may allow users to search the Web or other like networks using search engine content management systems or search engines. In certain instances, a search engine may enable a user to search the Web by inputting one or more search queries, for example, so as to try to locate and/or retrieve digital content of interest. In addition to locating and/or retrieving digital content, search engines may deliver and/or present or render retrieved content to a user in a suitable manner, such as via an associated computing device having a display capability.

In some instances, particular digital content delivered to and/or displayed on a user computing device may include, for example, one or more advertisements embedded or "impressed" into a rendered web page. Particular digital content, such as one or more advertisements, for example, may also be returned and/or embedded within a listing of general search results, such as in response to a web search query, as another example. At times, quality of this or like digital content may, for example, be evaluated and/or assessed, at least in part, via a user's post-click experience, such as dwell time after interaction with digital content, such as via a click. For example, in some instances, dwell time or time spent by a user on a landing page, such as a web page a user is redirected to after clicking on a particular digital content before returning back to an originating website may be used, at least in part, to determine whether the landing page meets user's click intent that brought such a user to such a page. Thus, since at times longer dwell time may lead a user to "converting" (e.g., purchasing an item, registering to a mailing list, etc.), building an affinity with a particular company, brand, etc., how to improve digital content quality, such as via providing a positive post-click experience, for example, continues to be an area of development.

BRIEF DESCRIPTION OF THE DRAWINGS

Claimed subject matter is particularly pointed out and distinctly claimed in the concluding portion of the specification. However, both as to organization and/or method of operation, together with objects, features, and/or advantages thereof, it may be best understood by reference to the following detailed description if read with the accompanying drawings in which:

FIG. 3 is a graph illustrating a cumulative distribution function (eCDF) of average dwell time for landing pages, according to an embodiment;

FIG. 4 is a graph illustrating feature importance, according to an embodiment;

FIGS. 5(a)-5(d) are plots illustrating transformation distributions across a set of landing pages, according to an embodiment;

FIGS. 7(a)-7(c) are plots illustrating frequent features appearing in top transformations, according to an one embodiment.

Figure 1:
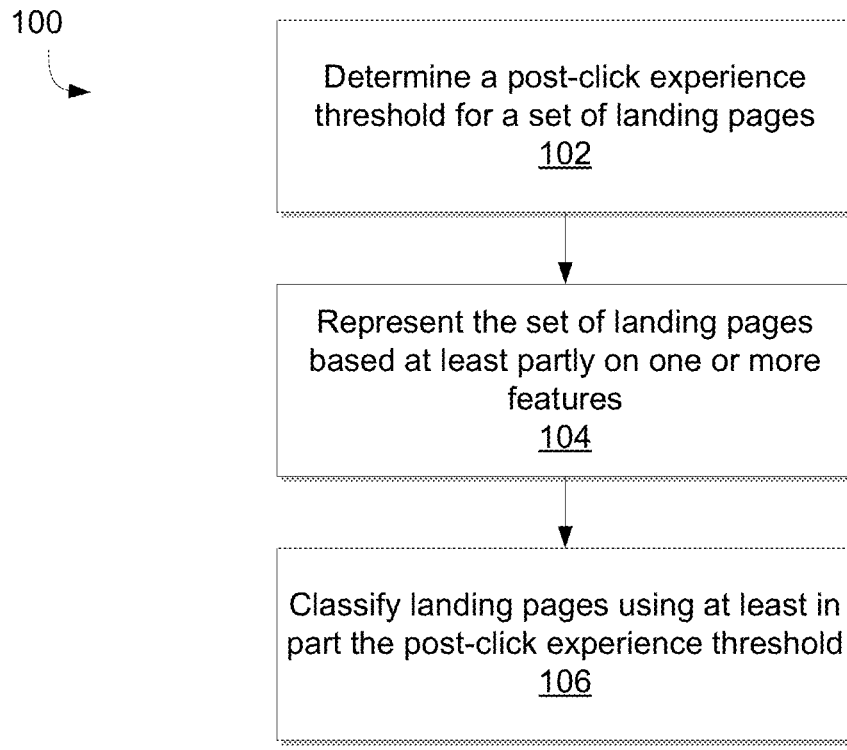
FIG. 1 is a flow diagram illustrating an implementation of a process for classifying landing pages.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents.

DETAILED DESCRIPTION

References throughout this specification to one implementation, an implementation, one embodiment, an embodiment, and/or the like means that a particular feature, structure, characteristic, and/or the like described in relation to a particular implementation and/or embodiment is included in at least one implementation and/or embodiment of claimed subject matter. Thus, appearances of such phrases, for example, in various places throughout this specification are not necessarily intended to refer to the same implementation and/or embodiment or to any one particular implementation and/or embodiment. Furthermore, it is to be understood that particular features, structures, characteristics, and/or the like described are capable of being combined in various ways in one or more implementations and/or embodiments and, therefore, are within intended claim scope. In general, of course, as has always been the case for the specification of a patent application, these and other issues have a potential to vary in a particular context of usage. In other words, throughout the disclosure, particular context of description and/or usage provides helpful guidance regarding reasonable inferences to be drawn; however, likewise, "in this context" in general without further qualification refers to the context of the present disclosure.

Some example methods, apparatuses, and/or articles of manufacture are disclosed herein that may be used, in whole or in part, to facilitate and/or support one or more operations and/or techniques for changing machine learning (ML) classification of digital content, such as implemented in connection with one or more computing and/or communication networks and/or protocols (e.g., network protocols) discussed herein, for example. As will be seen, in some instances, ML classification of digital content may, for example, be changed via one or more adjustments to one or more features of digital content. As alluded to previously, in some instances, digital content may comprise, for example, one or more on-line advertisements or ads embedded or "impressed" into one or more portions of a rendered web page and/or listing of returned search results, such as in connection with personalized or like digital content delivery services, though claimed subject matter is not so limited. As used herein, "on-line" refers to a type of a communication that may be implemented electronically, such as via one or more suitable communications networks (e.g., wireless, wired, etc.), for example.

"Content," as the term used herein, should be interpreted broadly and refers to signals, such signal packets, for example, and/or states, such as physical states on a memory device, for example, but otherwise is employed in a manner irrespective of format, such as any expression, realization, and/or communication, for example. Content may comprise, for example, any information, knowledge, and/or experience, such as, again, in the form of signals and/or states, physical or otherwise. In this context, "electronic," "digital," or "on-line content" refers to content in a form that although not necessarily capable of being perceived by a human, (e.g., via human senses, etc.) may nonetheless be transformed into a form capable of being so perceived, such as visually and/or audibly, for example. Non-limiting examples may include text, audio, images, video, combinations, or the like. Thus, content may be stored and/or transmitted electronically, such as before or after being perceived by human senses. In general, it may be understood that electronic and/or on-line content may be intended to be referenced in a particular discussion, although in the particular context, the term "content" may be employed for ease of discussion. Specific examples of content may include, for example, an e-mail message, text message, audio file, video file, web page, advertisement, or the like, or any combination thereof. Again, claimed subject matter is not intended to be limited to these examples, of course. At times, digital content may include one or more embedded references or hyperlinks to images, audio and/or video files, or other digital content. For example, one common type of reference may comprise a Uniform Resource Locator (URL).

As was indicated, in some instances, digital content, such as one or more on-line ads, for example, may be displayed in one or more portions of a rendered web page. In certain simulations or experiments, it has been observed that ads having the same or similar "look-and-feel" as a host web page, such as by having digital content messaging in line with surrounding content that drives users to the page, for example, may increase ad impressions, item conversions, click-through rates (CTRs), or the like. At times, these or like performance indicators, such as implemented in part to improve ad quality, for example, may prioritize short-term revenue, however, potentially at the expense of long-term revenue. Thus, in some instances, so-called "dwell time" or time spent by a user on a landing page, such as a web page a user is directed and/or re-directed to after clicking on a particular on-line ad before returning back to an originating website, for example, may be used, at least in part, as a proxy for ad quality. For example, in certain simulations or experiments, it has also been observed that longer dwell time on an ad landing page may lead a user to "convert" or purchase an item, register to a mailing list, build an affinity with a particular company, brand, or the like. As was also indicated and as used herein, "landing page" refers to a web page to which a user is directed and/or re-directed in response to the user's interaction with a particular digital content or a portion thereof, such as clicking on an on-line ad having an embedded reference or hyperlink, for example.

As such, in some instances, evaluating landing pages may, for example, be useful to at least partially measure actual user engagement (e.g., a click, etc.) and/or potentially predict user post-click behavior (e.g., dwell time, etc.) and, thus, improve quality of particular digital content, such as one or more ads as well as long-term ad revenue, among other things. For example, at times, it may be useful to determine one or more features of particular digital content, such as on-line ads, as one example, that may be predictive of quality of such digital content. Thus, at times, these or like one or more features of digital content may also be used, at least in part, to determine one or more approaches, such as ML approaches discussed below, as an example, for improving digital content quality that may be employed, in whole or in part, by digital content providers, delivery services, computing platforms, or the like. Accordingly, it may be desirable to develop one or more methods, systems, and/or apparatuses that may improve quality of digital content, such as one or more on-line ads, for example, which may provide an increased return on investment and/or revenue, long-term or otherwise, facilitate and/or support information-seeking behavior of on-line users, lead to an increased usability of a search engine, offer better on-line user experience, or the like.

Thus, as will be described in greater detail below, in an implementation, quality of digital content may, for example, be defined and/or measured, such as via dwell time or time spent on landing pages of interest. Based, at least in part, on dwell time, a number of features for associated landing pages may, for example, be determined and used, at least in part, to construct a ML classifier capable of distinguishing between lower and higher quality digital content. Here, depending on an implementation, logistic regression, decision tree, random survival forests approximation, or like approaches may, for example, be used, at least in part, or otherwise considered, though claimed subject matter in not so limited. In some instances, an ML classifier may, for example, be employed, at least in part, to change a ML classification, such as for a lower quality landing page (e.g., reclassify it as a higher quality landing page, etc.) and, thus, potentially improve landing page quality, as will also be seen.

FIG. 1 is a flow diagram illustrating an implementation of an example process 100 that may be performed, in whole or in part, to facilitate and/or support one or more operations and/or techniques for changing ML classification of digital content, such as on-line ads, for example. As was indicated, at times, example process 100 may be implemented, at least in part, in connection with one or more machine learning approaches, which may include, for example, one or more adjustments to one or more features of digital content. It should be noted that content acquired and/or produced, such as, for example, input signals, output signals, operations, results, etc. associated with example process 100 may comprise and/or be represented via one or more digital signals. It should also be appreciated that even though one or more operations are illustrated and/or described concurrently and/or with respect to a certain sequence, other sequences and/or concurrent operations may be employed, in whole or in part. In addition, although the description below references particular aspects and/or features illustrated in certain other figures, one or more operations may be performed with other aspects and/or features.

As illustrated, example process 100 may, for example, begin at operation 102 with determining a post-click experience threshold for particular digital content, such as a set of landing pages, for example. As will be seen, a post-click experience threshold may, for example, be used, at least in part, to separate lower quality landing pages from higher quality landing pages. Namely, a landing page may be of higher quality if its dwell time is above a post-click experience threshold, and of lower quality otherwise. Particular examples of determining a post-click experience threshold will be discussed in greater detail below. A set of landing pages may, for example, be determined, at least in part, experimentally and/or may be pre-set, for example, and/or otherwise dynamically determined depending, at least in part, on a digital content, particular service provider, application, or the like. By way of example but not limitation, in a particular simulation or experiment, 1,500 ads electronically delivered to and clicked on by users at least 500 times were used, though claimed subject matter is not so limited. Thus, in an implementation, dwell times for a set of landing pages (e.g., across a number of user visits) may be measured, for example, and a particular dwell time comprising and/or representative of a post-click experience threshold may be selected. As was indicated, in some instances, longer dwell times may correspond or correlate with a positive post-click experience of a user. As such, at times, selecting a suitable post-click experience threshold may comprise estimating a point above which a post-click experience may be considered positive, for example. Depending on an implementation, a suitable post-click experience threshold may comprise, for example, mean, median, etc. values of applicable dwell times, such as for a set of landing pages, by way of non-limiting example.

Continuing the above discussion, more specifically, according to an implementation, landing pages may, for example, be of higher quality if dwell time is above a threshold $\tau$ (and thus predictive of a positive post-click user experience, for example), and of lower quality otherwise, as was indicated. Selecting a suitable post-click experience threshold $\tau$ may comprise, for example, evaluating dwell times for a plurality of landing pages and selecting a value of $\tau$ above which landing pages may be considered to be of higher quality. In some instances, this may be accomplished, for example, via a continuous random variable $W_i$ denoting a measured dwell time of a landing page $w_i$. Let $n_i$ denote a number of observations $W_{i,1}, \ldots, W_{i,n_i}$, where $W_{i,j}$ has a same yet unknown population mean $\mu_i$ and variance $\sigma_i^2$. An unbiased estimate of $\mu_i$ may comprise, for example, a sample mean $$\overline{W_i} = \frac{1}{n_i} \sum_{j=1}^{n_i} W_{i,j}, \text{ i.e. } E[\overline{W_i}] = \mu_i.$$

Determining a threshold $\tau$ across landing pages in a set may at least partially be implemented via aggregating sample mean values computed from m different landing pages, such as $\overline{W}_1, \ldots, \overline{W}_m$, for example. Due, at least in part, to potential outlying of sample mean dwell time values, at times, a median of observed sample means may, for example, be used, at least in part, to determine a dwell time threshold $\tau$. Thus, consider, for example:

$$\tau = \text{Med}(\overline{W}_1, \ldots, \overline{W}_m)$$

A landing page w may, for example, be of higher quality if its dwell time sample mean W is greater than $\tau$, meaning that, in some instances, if an average time users spend on a landing page is greater than an average time users spend on at least 50% of any other landing page, it may be of higher quality, and of lower quality otherwise.

It is noted that, in certain embodiments, a threshold $\tau$ may be based, at least in part, on a dwell time of landing pages comparable across landing page types (e.g., landing pages related to financial services, landing pages related to self-help courses, landing pages related to goods for purchase, etc.). Claimed subject matter is not so limited, of course. For example, in some instances, a threshold $\tau$ may be based, at least in part, on a dwell time of landing pages that may differ across landing page types.

As noted above, there may be an association or correlation between quality of particular digital content, such as landing pages representing a positive post-click user experience, for example, and one or more features associated with landing pages. Thus, as illustrated via operation 104 of FIG. 1, in an implementation, it may be useful, for example, to represent landing pages of interest based, at least in part, on one or more features associated with these landing pages. As will be seen, in some instances, one or more features associated with landing pages may, for example, be used, at least in part, to predict quality of digital content, such as ads, as one possible example. Thus, without loss of generality, let $\mathcal{X} \subseteq \mathbb{R}^n$ denote an n-dimensional vector space of real-valued features. A vector $x \in \mathcal{X}$ may comprise, for example, an n-dimensional feature vector, such as $x = (x_1, x_2, \ldots, x_n)^T$, for an object in vector space $\mathcal{X}$. Here, a vector x may comprise, for example, a feature vector for an ad. A particular vector x may be associated with an ML label, such as a binary class label, for example, for a lower quality (e.g., negative) landing page or higher quality (e.g., positive) landing page, by way of example. At times, this may indicate whether an expected dwell time on a landing page is above or below a threshold $\tau$, respectively. Let $\mathcal{Y} = \{-1, +1\}$ denote a set encoding possible ML labels, such as binary class labels, for example.

In some instances, it may, for example, be desirable and/or useful to find a target function $f: \mathcal{X} \rightarrow \mathcal{Y}$, which may be capable of mapping a feature vector of a landing page to a corresponding ML label, such as a binary class label. Given a labeled (e.g., negative) set of m landing page instances $\mathcal{D} = \{(x_1, y_1), (x_2, y_2), \ldots, (x_m, y_m)\}$, it may be desirable to estimate $\hat{f}$ which may approximate an $f$ on $\mathcal{D}$, such as according to a loss function $\ell$, for example. Such a function $\hat{f}$ may be capable of measuring a "cost" of prediction errors that may result were target $f$ to be replaced with estimate $\hat{f}$. If estimate $\hat{f}$ is a member of a family of functions (e.g., a hypothesis space $\mathcal{H}$), an ML classifier may comprise, for example, a function in $\mathcal{H}$ that may minimize or satisfy the loss function:

$$\hat{f} = \underset{f^* \in \mathcal{H}}{\operatorname{argmin}}\{\ell(f, f^*; D)\}$$

As noted above, at times, a particular ML classification, such as distinguishing between higher and lower quality ad landing pages via a binary classifier, for example, may be based, at least in part, on one or more features associated with these landing pages. By way of example but not limitation, some examples of landing page features computed in connection with one particular simulation or experiment are illustrated in Table 1 below. It should be appreciated that features shown are merely examples to which claimed subject matter is not limited. A particular feature may, for example, be associated with a feature category and a feature source. In this context, "feature category" refers to a type of a feature, and "feature source" refers to a computed feature origin. A feature source may, for example, specify whether a particular feature is computed from an ad landing page (LP) (e.g., a post-click feature), an ad creative (CR) (e.g., a pre-click feature), or a combination thereof (CR-LP), for example.

Sample feature categories may include, for example:

Language: describing language style used in textual content;

DOM (LP): from HyperText Markup Language (HTML) Document Object Model (DOM) elements of a landing page;

Readability: describing readability of textual content;

Mobile Optimizing (LP): describing whether a landing page is mobile-optimized or not;

Media (LP): describing multimedia content characteristics of landing page;

Input (LP): indicating number of input element types in landing page;

Content & Similarity: describing similarity between the ad creative and corresponding landing page;

History: describing past performance of ad using engagement metrics.

Thus, consider, for example:

TABLE 1

Example features.

| Category | Feature | Source | Description |
|---|---|---|---|
| Language | L:AS | CR | whether ad is for adult-related services like dating websites |
| | L:HS | CR | whether ad may suggest violence, intimidation, etc. |
| | L:SS | CR | whether (e.g., likelihood) ad is of spamming nature |
| DOM | D:LMTL | LP | main text length (without boilerplate text) |
| | D:LTL | LP | text length |
| | D:LTMTR | LP | ratio of main text to text length |
| | D:LEC | LP | number of hyperlinks pointing to external web sites |
| | D:LEIR | LP | ratio of external to internal hyperlinks |
| | D:LETR | LP | ratio of external hyperlinks to total number of hyperlinks |
| | D:LIC | LP | number of hyperlinks pointing to web pages of a same web site as landing page |
| | D:LITR | LP | ratio of internal hyperlinks to total number of hyperlinks |
| | D:LMLER | LP | ratio of main text length to external hyperlinks |
| | D:LMLIR | LP | ratio of main text length to internal hyperlinks |
| | D:LMLTR | LP | ratio of main text length to total number of hyperlinks |
| | D:LTLER | LP | ratio of text length to external hyperlinks |
| | D:LTLIR | LP | ratio of text length to internal hyperlinks |
| | D:LTLTR | LP | ratio of text length to total number of hyperlinks |
| | D:LTC | LP | sum of external and internal hyperlinks |
| Readability | R:RHS | LP | Flesch-Kincaid score of landing page (see, e.g., Kincaid, J. P., R. P. Fishburn, R. Rogers, and B. Chissom. "Derivation of new readability formulas for Navy enlisted personnel (Research Branch Report 8-75)." *Memphis, TN: Naval Air Station, Millington, Tennessee* (1975): 40.) |
| | R:RSS | CR | Flesch-Kincaid score of ad creative's text |
| | R:RTS | CR | Flesch-Kincaid score of ad creative's title |
| | R:SAS | LP | likelihood that landing page can be summarized |
| | R:TC | LP | number of tokens (words) in the text |
| Mobile optimizing | MO:CTC | LP | whether there is a click-to-call button |
| | MO:VP | LP | indicates whether landing page can be tuned to different screen sizes |
| | MO:WS | LP | total width of all <div> tags on the page |
| Media | M:IH | LP | height of landing page |
| | M:IW | LP | width of landing page |
| | M:M | LP | whether host webpage of landing page is responsive |
| | M:NI | LP | number of displayed images |
| Input | I:NC | LP | number of clickable elements |
| | I:NIC | LP | number of checkboxes |
| | I:NID | LP | number of dropdown elements |
| | I:NIR | LP | number of radio buttons |
| | I:NIS | LP | number of input text areas |
| Content & Similarity | CS:NSS | LP | number of nouns in landing page |
| | CS:NCA | LP | Number of Wikipedia ® entities (e.g., URLs pointing to an article, etc.) in landing page |

TABLE 1-continued

Example features.

| Category | Feature | Source | Description |
|---|---|---|---|
| | CS:SN | CR-LP | Jaccard similarity between the set of nouns in the ad creative's title and landing page (see, e.g., Morisita, Masaaki. "Measuring of interspecific association and similarity between communities." *Mem. Fac. Sci. Kyushu Univ. Series* E 3 (1959): 65-80 (referring to "Jaccard similarity" by original French term, "coefficient de communaute").) |
| | CS:SWI | CR-LP | Jaccard similarity between the set of Wikipedia entities in the ad creative's title and landing page |
| History | H:HBR | LP | bounce rate (proportion of ad clicks with dwell time below 5 seconds) |
| | H:HDT | LP | median dwell as computed from the last 28 days of observed ad clicks |
| | H:HDC | LP | total number of valid ad clicks used to compute the two features above |

With regard to operation 106, landing pages may, for example, be classified using at least in part the post-click experience threshold. For example, here, a number of possible ML approaches for landing page classification may be used, in whole or in part, or otherwise considered. By way of example but not limitation, depending on an implementation, ML approaches to estimate $\hat{f}$ may include, for example, Logistic Regression (LogReg), Decision Trees (DT), Gradient Boosted Decision Trees (GBDT), and Random Forests (RF), or like functions or classifiers, which may include binary classifiers, or any combination thereof. Claimed subject matter is not so limited, of course.

More specifically, a set of values $\mathcal{D}=\{(x_1, y_1), (x_2, y_2), \ldots, (x_m, y_m)\}$ may, for example, be split into two subsets $\mathcal{D}_{train}$ and $\mathcal{D}_{test}$, such as using stratified random sampling, as one example. As an example of stratified random sampling, see Keyman, Jerzy. "On the two different aspects of the representative method: the method of stratified sampling and the method of purposive selection." *Journal of the Royal Statistical Society* 97, no. 4 (1934): 558-625, For example, on pages 567-570, an approach for selecting random elements from a population is discussed. Here, $\mathcal{D}_{train}$ may be used, at least in part, for training one or more ML functions and may comprise approximately 80% of $\mathcal{D}$, for example, and $\mathcal{D}_{test}$ may comprise the remaining values of $\mathcal{D}$ that may be used, at least in part, for evaluation purposes, if suitable or desired. In some instances, $\mathcal{D}_{train}$ may also be used, at least in part, for selection of one or more ML functions, such as via tuning hyperparameters for particular functions (e.g., parameters of previous distributions). See, as an example of tuning hyperparameters, Lindley, Dennis V., and Adrian FM Smith. "Bayes estimates for the linear model." *Journal of the Royal Statistical Society. Series B (Methodological)*(1972): 1-41. More specifically, hyperparameters, such as parameters of a general linear function having a general linear structure in terms of other quantities, for example, may be tuned herein.

Performance for these or like ML approaches as well as corresponding hyperparameters may, for example, be evaluated using one of more appropriate techniques. For example, at times, 10-fold cross validation may be utilized, in whole or in part. See, as an example, Zhang Ping. "Model Selection Via Multifold Cross Validation." *The Annals of Statistics* 21, no. 1 (1993): 299-313. Utilizing these or like approaches may, in some instances, provide indications of suitable or desirable settings, such as those yielding better cross validation performance, for example. At times, performance of ML approaches may, for example, be measured via a so-called Area Under the Curve of the Receiver Operating Characteristic (ROC AUC) approach, which is generally known and need not be described here in greater detail. In some instances, a particular ML approach may be subsequently re-trained, such as using a larger subset $\mathcal{D}_{train}$ using a hyperparameter setting, for example, such as determined previously using cross validation. Thus, a better or suitably performing ML function may, for example, be determined based, at least in part, on a comparison of a number of ML approaches using $\mathcal{D}_{test}$.

As was indicated, in a particular simulation or experiment, 1,500 ads electronically delivered to and clicked on by users at least 500 times were used for $\mathcal{D}$, though claimed subject matter is not so limited. FIG. 3 illustrates an implementation of an example empirical cumulative distribution function (eCDF) of an average dwell time as observed for these ads. As seen in this example, approximately 80% of ad instances may have an average dwell time within approximately 100.0 seconds, and 20% may have comparatively longer dwell times. Here, a dashed line represents a median τ of average dwell times, and, in this particular non-limiting example, comprises approximately 62.5 seconds, such as computed using an approach discussed above. As was indicated, at times, it may be useful for a threshold to reflect a balanced ground truth, such as with approximately 50% of ad instances having an average dwell time equal to or less than τ, for example, while remaining approximately 50% of ad instances having a dwell time above τ.

Continuing with the above discussion, to construct a labeled set of values $\mathcal{D}$, one or more ad features may, for example, be extracted for a particular ad, such as those listed in Table 1 above, just to illustrate one possible implementation. Since, in this particular example, features are categorical (e.g., a landing page background color) as well as continuous (e.g., a number of words in text of a landing page), for feature evaluation, such as via a common or standard feature space, a one-hot encoding approach may, for example, be used, in whole or in part. For example, here, a particular k-valued categorical feature may be transformed into a k-dimensional binary vector. Thus, the i-th component of such a vector may evaluate to 1 if a value of an original feature is i, and 0 otherwise. Continuous features may, for example, be standardized to a common feature space via transforming their original values into corresponding z-scores. See., e.g., David M. Diez, Christopher D. Barr, and Mine Çetinkaya-Rundel, OPENINTRO STATISTICS 129-130 (3d ed. 2015) for feature standardizing with z-scores. By way of example but not limitation, a z-score may be computed for an observation x for a distribution with mean µ and standard deviation σ as $$Z = \frac{x - \mu}{\sigma}.$$

In one particular simulation or experiment, forty-five standardized features were computed. Again, claimed subject matter is not limited to a particular approach or features. It is noted that one or more standardization processes discussed above may be optional in certain example implementations or other processes may be utilized, in whole or in part, to reduce or avoid ML classification performance fluctuations.

In an implementation, having constructed a labeled set of values $\mathcal{D}$, ML classification performance may, for example, be evaluated via $\mathcal{D}_{train}$ and $\mathcal{D}_{test}$, such as comprising 80% and 20% of total samples, respectively. As was also indicated, here, a 10-fold cross validation on $\mathcal{D}_{train}$, such as selecting between various ML approaches as well as hyperparameter settings may be employed, at least in part.

Namely, for LogReg, L1- and L2-norm regularizations may, for example, be evaluated along with five values of an inverse of regularization term $\mathcal{C} = \{0.1, 0.5, 1, 5, 10\}$. For DT, two node-splitting criteria s, such as Gini index and entropy, for example, may be evaluated. Also, a maximum depth of a tree d may, for example, be set to a total number of features. For GBDT, four values of a number K of base trees may, for example, be employed, with $\mathcal{K} = \{10, 100, 500, 1000\}$ and learning rates a, 0.001, 0.01, 0.05, 0.1, 1. For RF, a similar number of base trees may be used as for GBDT while bounding a maximum depth of a particular base tree to a total number of features. An example list of hyperparameter settings that may produce better cross validation via ROC AUC is illustrated in Table 2 below. In this particular example, an overall better performing approach appears to be RF, with 1,000 base trees and maximum depth 16.

TABLE 2

A list of example hyperparameter settings for ML approaches

| Approx. Approach | C | L | s | a | d | K | ROC AUC |
|---|---|---|---|---|---|---|---|
| RF | — | — | — | — | 16 | 1000 | 0.93 |
| GBDT | — | — | 0.1 | — | — | 100 | 0.92 |
| LogReg | 5 | L2 | — | — | — | — | 0.87 |
| DT | — | — | entropy | — | 3 | — | 0.84 |

("—" if the hyperparameter is not considered)

At times, to avoid mixing function selection with function evaluation, a particular ML function may be retrained, such as using $\mathcal{D}_{train}$ with a suitable hyperparameter setting, for example, and a validity of respective functions may be assessed using subset $\mathcal{D}_{test}$. While a number of possible quality metrics may be used herein, in whole or in part, for this example, $F_1$ and Matthews Correlation Coefficient (MCC) metrics were used. See, as an example, Matthews, Brian W. "Comparison of the predicted and observed secondary structure of T4 phage lysozyme." *Biochemica et Biophysica Acta (BBA)—Pro Structure* 405, no. 2 (1975): 442-451. Table 3 illustrates results of this evaluation as a non-limiting example. As seen, RF performed better that other functions with respect to a particular set of ads, and also with respect to generalizing its predictive ability for previously unseen examples.

TABLE 3

Evaluation of ML approaches on $\mathcal{D}_{test}$

| Approx. Approach | F1 | MCC |
|---|---|---|
| RF | 0.84 | 0.66 |
| GBDT | 0.81 | 0.63 |
| LogReg | 0.76 | 0.54 |
| DT | 0.75 | 0.49 |

At times, it may be desirable to evaluate which features are more important, such as which features contributed to a particular negative or positive ML classification, for example. In at least one implementation, for purposes of feature importance evaluation, a learned RF ML function may, for example, be used, at least in part. FIG. 4 illustrates a number of more important features, such as determined according to an RF ML function in connection with a particular simulation or experiment. In some instances, historical features (e.g., historical bounce rate (H:HBR)) may contribute to the ability of an ML approach to predict landing page quality, for example. Thus, at times, it may be desirable to at least partially employ historical features in an ML approach, such as to generate better recommendations (e.g., to ad services, platforms, etc.) for more effective landing pages. In some instances, historical features may, for example, be omitted, such as if these cannot be adjusted, such as discussed below.

As was indicated, having determined a number of important features, quality of a particular digital content, such as ad landing pages may be improved, such as via one or more adjustments to ML page classification, for example. For ease of discussion, here, an RF ML function is used, such as due, at least in part, to its performance. It should be noted, however, that any other suitable ML function (e.g., GBDT, etc.) may be used herein, in whole or in part, or otherwise considered.

Figure 2:
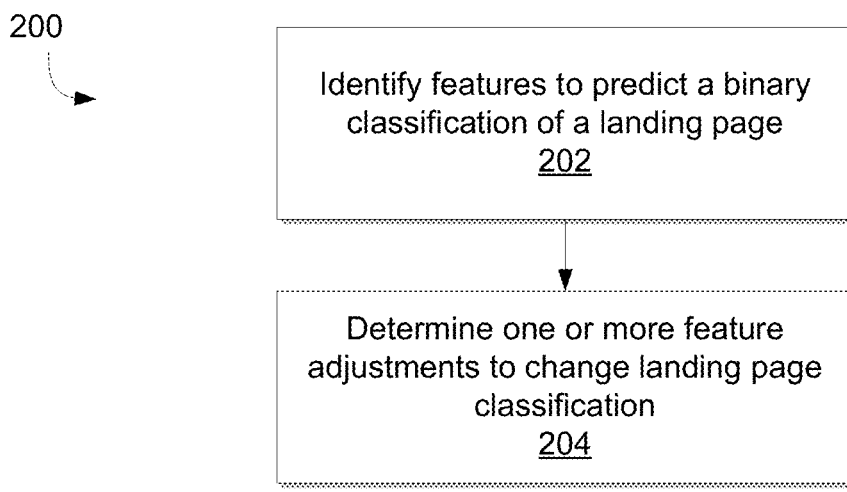
FIG. 2 is a flow diagram illustrating an implementation of a process for changing a landing page classification.

FIG. 2 is a flow diagram illustrating an implementation of an example process 200 that may be performed, in whole or in part, to facilitate and/or support one or more operations and/or techniques for changing ML classification of digital content, such as via one or more adjustments to one or more features of digital content, for example. Likewise, at times, example process 100 may be implemented, at least in part, in connection with one or more ML approaches, such as utilizing an RF function discussed above. Similarly, it should be noted that content acquired and/or produced, such as, for example, input signals, output signals, operations, results, etc. associated with example process 200 may comprise and/or be represented via one or more digital signals. It should also be appreciated that even though one or more operations are illustrated and/or described concurrently and/or with respect to a certain sequence, other sequences and/or concurrent operations may be employed, in whole or in part. In addition, although the description below references particular aspects and/or features illustrated in certain other figures, one or more operations may be performed with other aspects and/or features.

Example process 200 may begin with identifying features to predict a ML classification of a landing page, which may include a binary classification, for example. In an embodiment, an estimate $\hat{f}$, which may better or more suitably approximate $f$, may be represented as, for example, a set of K base ML classifiers or $\hat{f}=\phi(\hat{h}_1, \ldots, \hat{h}_K)$. Here, $\hat{h}_K: \mathcal{X} \to \mathcal{Y}$ denotes a base estimate, and denotes a function capable of combining output of individual base classifiers into a particular prediction, such as with respect to landing page quality (e.g., positive or negative).

In at least one implementation, a majority voting strategy for $\phi$ may, for example, be used, at least in part. In this example setting, a given instance x main obtain a predicted class label $\hat{f}(x)$ based, at least in part, on a result of a larger number (e.g., a majority, etc.) of ML base classifiers (e.g., if a majority of landing page features are positive, then the landing page may also be considered positive). This may, for example, comprise or be representative of a mode of base predictions. In some instances, such as in a binary ML classification setting, for example, $\phi$ may reduce the ML classification to a sum of base estimates. For example, an overall prediction of a set of base ML classifiers may be obtained as:

$$\hat{f}(x) = \begin{cases} +1 & \text{if } \left(\sum_{k=1}^{K} \hat{h}_k(x)\right) > 0 \\ -1 & \text{otherwise} \end{cases} \quad (1)$$

Although other approaches may be used, in whole or in part, with regard to $\phi$, these may have little or no effect on an overall ML classification approach, such as discussed herein. For example, since a particular ML classifier may produce probabilistic, rather than deterministic, class label predictions, $\phi$ may be implemented via averaging applicable probabilities to arrive at an overall prediction for a set of base ML classifiers.

In an embodiment, a particular base classifier $\hat{h}_k$ may, for example, be encoded, such as with a decision tree $T_k$, and therefore a set of ads may be represented as a forest $T=\{T_1, \ldots, T_K\}$, In some instances, RF may provide human interpretable ML base classifiers, for example, which may be desirable, such as for making suggestions as to how to improve ad landing pages. By way of non-limiting example, in an embodiment utilizing RF, a particular feature may comprise, for example, a number of words in a landing page text, which may be provided in a suggestion since it may be interpreted by a human (e.g., as opposed to a value such as [0, 1, 1, 0], etc.).

Thus, for transforming a lower quality ad into a higher quality ad, let $x \in \mathcal{X}$ denote an ad such that $f(x)=\hat{f}(x)=-1$ (e.g., a lower quality ad). An approach, thus, may include transforming an original input feature vector x into a new feature vector x' ($x \rightsquigarrow x'$) such that $\hat{f}(x')=+1$, such as via one or more adjustments to one or more features of a landing page to change its ML classification. Furthermore, of possible transformations x* (where x* represents a number of possible transformations), there may be a transformation with a lower cost. In some instances, it may be possible to thus determine a better (e.g., lower cost) transformation by computing x' based, at least in part, on a cost function $\delta: \mathcal{X} \times \mathcal{X} \to \mathbb{R}$. Thus, consider:

$$x' = \underset{x^*}{\operatorname{argmin}}\{\delta(x; x^*) \mid \hat{f}(x) = -1 \wedge \hat{f}(x^*) = +1\}$$

As noted, a cost function may, for example, measure an effort or resources that may be expended to transform x into x'. Possible considerations for a cost function may include (but not be limited to) a number of features affected by an x to x' transformation, Euclidean distance between an original vector x and a transformed vector x', or the like. Claimed subject matter is not so limited, of course.

Thus, at operation 202, one or more feature adjustments may, for example, be determined, such as to change an ML classification of a landing page. Namely, using RF as an example, a root-to-leaf path of a decision tree may, for example, be interpreted as a cascade of "if-then-else" statements for which internal (non-leaf) nodes comprise a Boolean operation or condition on a specific feature value against a threshold (e.g., $x_i \leq \theta_i$). As such, root-to-leaf paths may, for example, be evaluated, such as to determine which paths may be capable of yielding a leaf of a desired classifier (e.g., positive). For example, outgoing child branches from a node may indicate next-level conditions to be evaluated on a path. This may be repeated, such as until leaves of a decision tree are reached, at which point higher/lower classification labels may, for example, be determined.

Further, given a forest of K decision trees $T=\{T_1, \ldots, T_K\}$, $p_{k,j}$ may denote a j-th path of k-th tree $T_k$. Elements $p_{k,j}^+$ (or $p_{k,j}^-$) may denote j-th path of $T_k$ leading to a leaf node labeled as "high" or "low", referred herein to as a "positive" or "negative" path. At times, paths of a decision tree may contain n non-leaf nodes, for example, which may correspond to n Boolean conditions, one per a particular feature. It is noted that, at times, there may be a number of Boolean conditions associated with a particular feature. A root-to-leaf path may thus be represented via the following relation:

$$p_{k,j} = \{(x_1 \gtreqless \theta_1), (x_2 \gtreqless \theta_2), \ldots, (x_n \gtreqless \theta_n)\} \quad (2)$$

Here, $P_k^+ = U_{j \in T_k} p_{k,j}^+$ denotes a set of positive paths, and $P_k^- = U_{j \in T_k} p_{k,j}^-$ denotes a set of negative paths, and $P_k = P_k^+ \cup P_k^-$ denotes a set of paths in $T_k$.

In an embodiment, a number of possible paths in a decision tree, such as to estimate computation complexity, for example, may be determined. For example, if $p_{k,j} \in P_k$ denotes a length-n path, then $T_k$ denotes a depth-n binary tree having a number of leaves bounded to $2^n$. As a total number of leaves coincides with a total number of possible paths, a number of possible paths may, for example, be determined as $|P_k| \leq 2^n$.

In some instances, it may not be useful to bound $|P_k|$, as there might exist some paths $p_{k,j} \in P_k$ having a length that may be greater than n. Thus, in an embodiment, a maximum or otherwise sufficient number of paths may be specified, such as at training time, by bounding a depth of generated trees to a number of features n, for example. Given this approach, a total number of possible paths encoded by a forest T may comprise, for example, $\Sigma_{k=1}|P_k| \leq K2^n$.

Accordingly, in some instances, it may be possible to change an ML classification, which may include a binary ML classification, for example, of feature vector x, since $f(x) = \hat{f}(x) = -1$. If an overall prediction is obtained via a majority voting strategy, such as discussed above in connection with Relation 1, for example, then:

$$\hat{f}(x) = -1 \Leftrightarrow \left(\sum_{k=1}^{K} \hat{h}_k(x)\right) \le 0$$

Furthermore, at times, there may be at least $$\left\lceil \frac{K}{2} \right\rceil$$

decision trees (e.g., base classifiers) of forest T having an output of −1. That is, there may exist $K^- \subseteq \{1, \ldots, K\}$ with $$K^- \ge \left\lceil \frac{K}{2} \right\rceil,$$

such that:

$$\hat{h}_{k^-}(x) = -1, \forall k^- \in K^-$$

In an ML classification setting, such as a binary ML classification setting, for example, there may also exist $K^+ = \{1, \ldots, K\} \setminus K^-$, which denote a set of ML classifier indices that may output a positive label if input with x, or $\hat{h}_{k^+}(x) = +1$, $\forall k^+ \in K^+$.

As noted above, it may be desirable to change an original input feature vector x so as to adjust an ML classification (e.g., quality prediction set) from negative (−1) to positive (+1). At times, it may be possible to skip trees indexed by $K^+$, for example, since these trees may already embody a positive (e.g., higher quality) prediction. A process may then focus on trees $T_k$ where $k \in K^-$, and consider a set $P_k^+$ of its positive paths. For positive paths $p_{k,j}^- \in P_k^+$, it may be possible to associate an instance $x_j \in \mathcal{X}$ that satisfies a particular positive path. Instances that satisfy positive paths may comprise, for example, instances having adjusted feature values that meet Boolean conditions in $p_{k,j}^+$ in order to terminate at a higher-labeled leaf, and therefore $\hat{h}_k(x_j^+) = +1$.

It may be possible to restrict a (possibly infinite) number of instances satisfying $p_{k,j}^+$, by restricting to $x_{j(\in)}^+$ to denote feature value changes with a "tolerance" of at most $\in$ (e.g., at most, $\in$ feature changes are to be suggested). $\in$ may be determined dynamically and may comprise, for example, a constant representative of a "tolerance" of an adjusted feature value with respect to a minimum value it may take in order to pass a Boolean operation. This may be referred to as an $\in$-satisfactory instance of $p_{k,j}^+$ (e.g., a positive path with $\in$ or fewer suggested feature changes may be considered to be satisfactory). In an implementation, it may be possible to consider $p_{k,j}^+$ containing n Boolean conditions, as specified via Relation 2. Therefore, for $\in > 0$, a feature vector $x_{j(\in)}^+$ may be constructed as:

$$x_{j(\in)}^+[i] \begin{cases} \theta_i - \epsilon & \text{if the } i\text{-th condition is } (x_i \le \theta_i) \\ \theta_i + \epsilon & \text{if the } i\text{-th condition is } (x_i > \theta_i) \end{cases} \quad (3)$$

In an embodiment, since features may be standardized using a z-score, for example, a global tolerance $\in$ for these features may be utilized, in whole or in part. However, in such cases, a magnitude of a change may depend, at least in part, on $\in$ and a multiple of a unit of standard deviation from a feature mean, for example. Here, $$\theta_i = \frac{t_i - \mu_i}{\sigma_i}$$

denotes a z-score of a threshold on the i-th feature value, $t_i$ denotes a non-standardized value, and $\mu_i$ and $\sigma_i$ denote a mean and standard deviation of an i-th feature, respectively. If $\mu_i$ and $\sigma_i$ are unknown, a sample mean and a sample standard deviation may, for example, be used, at least in part. Further, $x_i = \theta_i \pm \in$ denotes an adjusted value of the i-th feature according to an ongoing transformation of an input vector x. Therefore, $$x_i = \frac{t_i - \mu_i}{\sigma_i} \pm \epsilon.$$

Returning to the original (i.e. non-standardized) feature scale, $x_i = t_i - \mu_i \pm \in \sigma_i$ may, for example, be computed. Depending on an ML classification of a feature (e.g., + or − sign), an adjusted feature may, for example, move closer to or farther away from original feature mean $\mu_i$, pivoting around $t_i$.

For a particular $p_{k,j}^+ \in P_k^+$, input feature vector x may, for example, be transformed into a $\in$-satisfactory instance $x_{j(\in)}^+$ that may validate positive path $p_{k,j}^+$. Thus, in some instances, this may yield a set of transformations $\Gamma_k = \cup_{j \in P_k^+} x_{j(\in)}^+$, associated with the k-th tree $T_k$.

In an implementation, a resulting transformation in $\Gamma_k$ may have an impact on other trees of a forest. At times, there might exist $l \in K^+$ whose corresponding tree provides a correct prediction if input with x, namely $\hat{h}_l(x) = +1$. It may also be the case that $\hat{h}_l(x') = -1$, such that by changing x into x' a prediction of an l-th tree may be insufficient. More particularly, by changing x into another instance $x' \in \Gamma_k$ a resulting prediction, rather than an overall prediction, may indicate that a k-th base classifier is correctly fixed (e.g., from $\hat{h}_k(x) = -1$ to $\hat{h}_k(x') = +1$).

If a change from x to x' leads to $\hat{f}(x') = +1$, then x' may comprise, for example, a candidate transformation for x. Namely, for $\Gamma = \cup_{k=1}^{K} \Gamma_k$ denoting a set of $\in$-satisfactory transformations of an original x from positive paths of trees in a forest, a feature adjustment may, for example, be generally defined as:

$$x' = \underset{x_{j(\in)}^+ \in \Gamma | \hat{f}(x_{j(\in)}^+) = +1}{\operatorname{argmin}} \{\delta(x, x_{j(\in)}^+)\}$$

It is noted that a definition above may be valid for a base case for which K=1 since, in a base case, an additional condition of $\hat{f}(x_{j(\in)}^+) = +1$ may be less useful. In this example, a set may comprise, for example, a particular base classifier, meaning that a forest may contain a decision tree with features that may be adjusted, thus, leading to a change in a predicted ML classifier for a landing page.

In an embodiment, the following approach or algorithm for changing an ML classification of a landing page may, for example, be employed, at least in part. For this example, four input components may, for example, be received. Thus, consider:

1. A trained ML function $\hat{f}$;
2. A feature vector x representing a lower quality landing page (e.g., a negative instance);
3. A cost function measuring effort for transforming a lower quality landing page into a higher quality landing page; and
4. A positive threshold $\in$ that bounds adjustments to particular features of x so as to pass Boolean operations on a positive path of a particular tree.

As a result, a transformation x' of the original x that exhibits a minimum or satisfactory cost according to δ may be implemented. An example approach or algorithm is illustrated via a pseudo code routine below.

Here, computational complexity of an example approximation approach may, for example, be evaluated. This may include, for example, evaluating K trees of a forest having negative base predictions (low-labeled).

```
Pseudo code process adjustFeatures
| Input:
|▷ An estimate function f̂ resulting from a set of decision trees T =
|    {T₁, . . . , T_K}, a particular one associated with a base estimate ĥ_k,
|    k = 1, . . . , K
|▷ A feature vector x representing a true negative instance, such
|    that f(x) = f̂(x) = −1
|▷ A cost function δ
|▷ A (small) threshold ε > 0
| Output:
|▷ Transformation x' with respect to δ, such that f̂(x) = +1
| Begin
|  | x'← x;
|  | δ_min ← + ∞;
|  | for k = 1, . . . ; K do
|  |  | if f̂(x) == ĥ_k (x) and ĥ_k(x) == −1 then
|  |  |  | /* retrieve set of positive paths of the k-th decision tree */
|  |  |  | P_k⁺ ← getPositivePaths( T_k );
|  |  |  | foreach p_{k,j}⁺ ∈ P_k⁺ do
|  |  |  |  | /* generate the ε-satisfactory instance associated with the j-th
|  |  |  |  |    positive path of the k-th decision tree */
|  |  |  |  | x_{j(ε)}⁺ ←buildPositiveInst(x, p_{k,j}⁺, ε);
|  |  |  |  | if f̂(x_{j(ε)}⁺) == +1 then
|  |  |  |  |  | if δ(x; x_{j(ε)}⁺) < δ_min then
|  |  |  |  |  |  | x'← x_{j(ε)}⁺;
|  |  |  |  |  |  | δ_min ← δ(x; x_{j(ε)}⁺);
|  |  |  |  |  | end
|  |  |  |  | end
|  |  |  | end
|  |  | end
|  | end
| return x';
| end
| Procedure buildPositiveInst(x,p⁺, ε)
|  | Begin
|  |  | x' ← x.deep_copy( ); // deep copy of the original input instance x
|  |  | foreach (feature, direction, threshold) ∈ p⁺ do
|  |  |  | /* examine conditions represented by p⁺ ; each condition is a triple
|  |  |  |    containing feature (id), direction (i.e. "≤" or ">"), and threshold */
|  |  |  | if direction == "≤" then
|  |  |  |  | if x[feature] > threshold then
|  |  |  |  |  | /* the feature value of this instance breaks the current path
|  |  |  |  |     condition */
|  |  |  |  |  | x'[feature] ← threshold −ε;
|  |  |  |  | end
|  |  |  | end
|  |  |  | else /* the direction of the current path condition is ">" */
|  |  |  |  | if x[feature] ≤ threshold then
|  |  |  |  |  | /* the feature value of this instance breaks the current path
|  |  |  |  |     condition */
|  |  |  |  |  | x'[feature] ← threshold + ε;
|  |  |  |  | end
|  |  |  | end
|  |  | end
|  |  | return x';
|  | end
```

In an implementation, positive paths of different trees may, for example, be considered, and for these, a $\in$-transformation may be constructed, such as according to Relation 3, as one possible example. Here, a number of node traversals may depend, at least in part, on a number of positive paths in a tree, which in turn may depend, at least in part, on a number of leaves in the tree. At times, a decision tree depth and, thus, its number of leaves may not be limited, such as a priori, but these may be bounded, such as while training an ML function, for example, as was indicated. Further, it may be possible to set a maximum length for root-to-leaf paths (e.g., depth of a particular tree) to be no greater than, for example, a number of input features n. By so doing, it may be possible to limit a total number of positive paths to be examined to $K2^n$, and thereby constraining computational complexity to $O(2^n)$, for example. While, in some instances, a search space may be exponential in terms of feature numbers, for example, experimental results illustrate that maximum or sufficient depth of trees having a better ML classification result may comprise d=16, which is below a total number of features n=45 (see Table 1). Claimed subject matter is not so limited, of course. Additionally, certain positive paths may share one or more Boolean conditions, especially when extracted from a same decision tree. As such, it may be possible to avoid adjusting a same input feature a number of times, such as according to a same condition, for example. As should be appreciated, the above approach or algorithm may be implemented in parallel, since a particular tree may be evaluated independently.

As was indicated, according to a particular simulation or experiment, generated ad feature recommendations were validated by applying the above approach or algorithm with a learned RF function. As part of this validation process, resulting x' arising from a valid (i.e. positive) $\in$-transformation of an original negative instance x may comprise, for example, a set of recommendations for adjusting ad features represented by x. A vector r resulting from a component-wise difference between x' and x may, for example, be computed as r[i]=x'[i]−x[i]. For a particular feature i, such that r[i]≠0 (e.g., x'[i]≠x[i]), for example, vector r may provide a magnitude and direction of adjustments to be made on i. The former may indicate an absolute value of adjustments (e.g., |x'[i]−x[i]|), whereas the latter may indicate whether a result comprises an increase or a decrease of an original value of i (e.g., sgn(x'[i]−x[i])). At times, it may be possible to derive a final list of recommendations, such as by sorting r according to a desired feature ranking, such as shown in FIG. 4, by way of example.

As was indicated, a particular approach may depend, at least in part, on a cost (δ) of feature adjustment associated with transforming a lower quality landing page into a higher quality one, and a tolerance ($\in$) of feature adjustment used to adjust an individual landing page feature. At times, an impact of $\in$ on landing page coverage may, for example, be evaluated, where landing page coverage refers to a percentage of landing pages for which a particular ML approach may be able to provide recommendations. In a particular experiment, landing page coverage was evaluated by experimenting with five values of $\in$, 0.01, 0.05, 0.1, 0.5, and 1, though claimed subject matter is not so limited. These values of $\in$ may be considered multiples of a unit of standard deviation from a particular individual feature mean. Table 4, below, illustrates that higher landing page coverage may be achieved if $\in$=0.5.

TABLE 4

An impact of tolerance threshold
∈ landing page coverage.

| ∈ | Ad coverage (%) |
|---|---|
| 0.01 | 58.5 |
| 0.05 | 64.2 |
| 0.10 | 72.3 |
| 0.50 | 77.4 |
| 1.00 | 63.2 |

In some instances, certain lower quality landing pages may be prone to multiple transformations. For example, FIGS. 5(a)-5(d) illustrate ∈-transformation distributions across a set of ads, as generated using different values of ∈ (except ∈=1, which was determined to be similar to ∈=0.05), according to a particular implementation. As seen, a higher number of transformations may, for example, be proposed for a fewer number of ads. As also seen, a number of transformations may, for example, be more evenly distributed across ads as ∈ increases. Namely, for this example, larger values of ∈ result in higher landing page coverage until decreasing again between ∈=0.5 and 1. Claimed subject matter is not limited to particular distributions, values, etc. shown.

At times, a preferred transformation for a given landing page may, for example, be determined, at least in part, by considering a number of feature adjustment cost functions (e.g., tweaking), with input of original (x) and transformed (x') feature vectors. Thus, consider, as an example:

tweaked_feature_rate: proportion of features affected by a transformation of x into x' (range=[0, 1]);
euclidean_distance: Euclidean distance between x and x' (range=);
cosine_distance: 1 minus a cosine of an angle between x and x' (range=[0, 2]);
jaccard_distance: ones' complement of Jaccard similarity between x and x' (range=[0, 1]);
pearson_correlation_distance: 1 minus the Pearson's correlation coefficient between x and x' (range=[0, 2]).

Figures 6A, 6B:
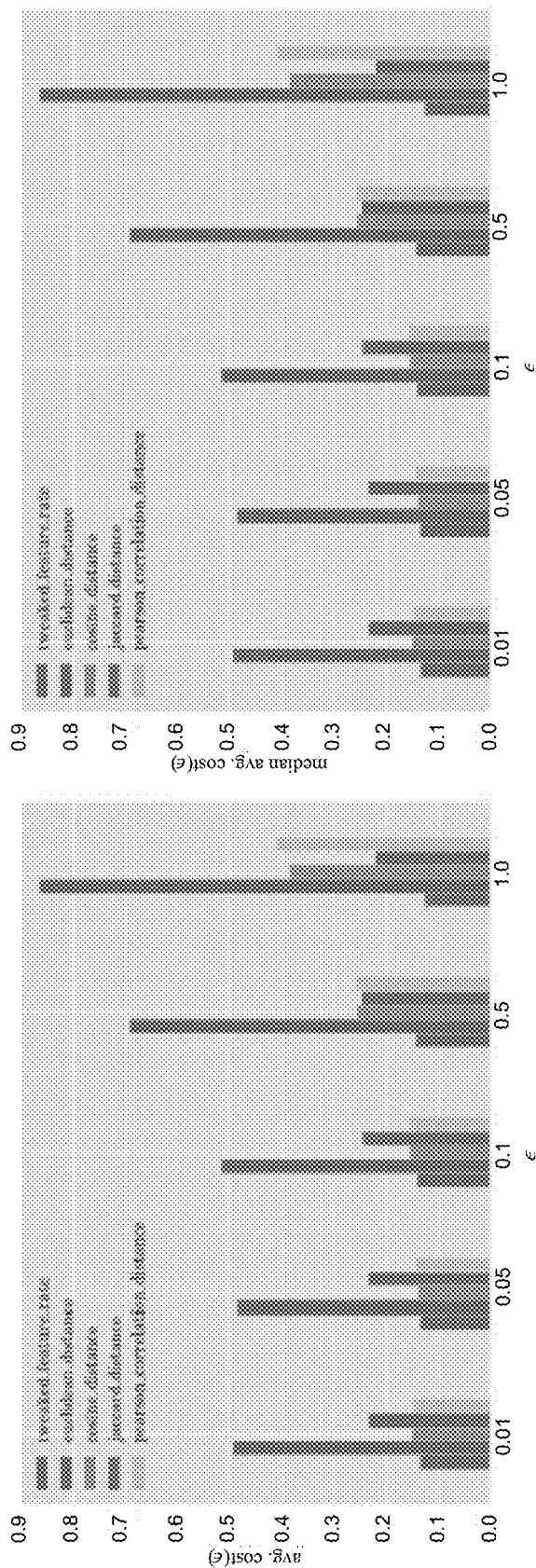
FIGS. 6(a)-6(b) are plots illustrating impact of tolerance threshold on costs, according to an embodiment.

In an embodiment, a tolerance ∈ may be positively correlated with ad coverage (e.g., up to a certain value). Interplay between a tolerance ∈ and these or like feature adjustment cost functions, above, is illustrated in example plots of FIGS. 6(a) and 6(b) in accordance with an implementation. FIG. 6(a) illustrates example plots for micro-average costs, and FIG. 6(b) illustrates a median of individual per-landing page average costs. As seen, it may be determined that, in some instances, the greater the tolerance ∈, the higher the cost (except for tweaked_feature_rate and jaccard_distance if ∈=1). Thus, a tradeoff between ∈ (i.e. landing page coverage) and a cost of landing page transformations δ may be desirable. As also seen, on average, ∈=0.05 may lead to a smaller cost (see FIG. 6(b)). Of course, claimed subject matter is not limited to particular plots, values, etc.

According to a particular experiment, results for a set of recommendations obtained from ∈-transformations using ∈=0.05 and δ=cosine_distance is shown in graphs of FIGS. 7(a)-7(c). Namely, FIGS. 7(a)-7(c) show top-5 most frequent features for which adjustment was recommended according to top-1, top-2 and top-3 proposed transformations (e.g., for a particular feature, a number of times that it appears (in percentage) among the top-1, top-2 and top-3 ∈-transformations). Top-most frequent feature in settings is denoted via D:LTLTR, which measures a ratio of text length to a total number of hyperlinks in a landing page. This result indicates that lower quality landing pages may generally exhibit an unbalanced ratio of text to external links in favor of the former.

At times, a Pearson's correlation coefficient (ρ) between top-1, top-2 and top-3 most frequent feature rankings may also be measured. As seen, three rankings are related to each other, with top-1 reaching ρ=0.93 and 0.81 if compared to top-2. Similarly, top-2 is correlated to top-3 (ρ=0.79). These values were empirically determined to be statistically significant at α=0.01. A correlation coefficient between top-1 most frequent feature ranking for values of ∈ may also be determined. Here, a higher correlation is obtained between top-1 rankings derived from ∈=0.05 and 0.1 (ρ=0.92). Again, claimed subject matter is not limited to rankings, values, etc. shown.

As part of a particular simulation or experiment, an internal team of human judges was asked to assess the recommendations generated. Ten lower quality landing pages were randomly selected. For these, human evaluators judged generated recommendations using top-1 ∈-transformation with a lower cost. A particular recommendation was associated with a binary score: helpful or not helpful. Overall, evaluators found 68.2% of recommendations helpful. On average, 67.5% recommendations were considered correct. The human evaluators highlighted the ability of one or more ML approaches, such as discussed herein, to more correctly pinpoint aspects that may have detrimental effect on post-click user experience. For example, when shown a landing page containing three dropdown menus, an ML classification approach may recommend increasing the amount of textual content, and otherwise decreasing the number of drop-down menus. For another ad in a health area, for example, with a larger amount of text and medical terms, proposed recommendations may be made to improve readability of a landing page, just to illustrate another possible example. Again, claimed subject matter is not limited to particular areas, recommendations, etc.

In the context of the present disclosure, the term "connection," the term "component" and/or similar terms are intended to be physical, but are not necessarily always tangible. Whether or not these terms refer to tangible subject matter, thus, may vary in a particular context of usage. As an example, a tangible connection and/or tangible connection path may be made, such as by a tangible, electrical connection, such as an electrically conductive path comprising metal or other electrical conductor, that is able to conduct electrical current between two tangible components. Likewise, a tangible connection path may be at least partially affected and/or controlled, such that, as is typical, a tangible connection path may be open or closed, at times resulting from influence of one or more externally derived signals, such as external currents and/or voltages, such as for an electrical switch. Non-limiting illustrations of an electrical switch include a transistor, a diode, etc. However, a "connection" and/or "component," in a particular context of usage, likewise, although physical, can also be non-tangible, such as a connection between a client and a server over a network, which generally refers to the ability for the client and server to transmit, receive, and/or exchange communications, as discussed in more detail later.

In a particular context of usage, such as a particular context in which tangible components are being discussed, therefore, the terms "coupled" and "connected" are used in a manner so that the terms are not synonymous. Similar terms may also be used in a manner in which a similar intention is exhibited. Thus, "connected" is used to indicate that two or more tangible components and/or the like, for example, are tangibly in direct physical contact. Thus, using the previous example, two tangible components that are electrically connected are physically connected via a tangible electrical connection, as previously discussed. However, "coupled," is used to mean that potentially two or more tangible components are tangibly in direct physical contact. Nonetheless, is also used to mean that two or more tangible components and/or the like are not necessarily tangibly in direct physical contact, but are able to co-operate, liaise, and/or interact, such as, for example, by being "optically coupled." Likewise, the term "coupled" may be understood to mean indirectly connected in an appropriate context. It is further noted, in the context of the present disclosure, the term physical if used in relation to memory, such as memory components or memory states, as examples, necessarily implies that memory, such memory components and/or memory states, continuing with the example, is tangible.

Unless otherwise indicated, in the context of the present disclosure, the term "or" if used to associate a list, such as A, B, or C, is intended to mean A, B, and C, here used in the inclusive sense, as well as A, B, or C, here used in the exclusive sense. With this understanding, "and" is used in the inclusive sense and intended to mean A, B, and C; whereas "and/or" can be used in an abundance of caution to make clear that all of the foregoing meanings are intended, although such usage is not required. In addition, the term "one or more" and/or similar terms is used to describe any feature, structure, characteristic, and/or the like in the singular, "and/or" is also used to describe a plurality and/or some other combination of features, structures, characteristics, and/or the like. Furthermore, the terms "first," "second" "third," and the like are used to distinguish different aspects, such as different components, as one example, rather than supplying a numerical limit or suggesting a particular order, unless expressly indicated otherwise. Likewise, the term "based on" and/or similar terms are understood as not necessarily intending to convey an exhaustive list of factors, but to allow for existence of additional factors not necessarily expressly described.

Furthermore, it is intended, for a situation that relates to implementation of claimed subject matter and is subject to testing, measurement, and/or specification regarding degree, to be understood in the following manner. As an example, in a given situation, assume a value of a physical property is to be measured. If alternatively reasonable approaches to testing, measurement, and/or specification regarding degree, at least with respect to the property, continuing with the example, is reasonably likely to occur to one of ordinary skill, at least for implementation purposes, claimed subject matter is intended to cover those alternatively reasonable approaches unless otherwise expressly indicated. As an example, if a plot of measurements over a region is produced and implementation of claimed subject matter refers to employing a measurement of slope over the region, but a variety of reasonable and alternative techniques to estimate the slope over that region exist, claimed subject matter is intended to cover those reasonable alternative techniques, even if those reasonable alternative techniques do not provide identical values, identical measurements or identical results, unless otherwise expressly indicated.

It is further noted that the terms "type" and/or "like," if used, such as with a feature, structure, characteristic, and/or the like, using "optical" or "electrical" as simple examples, means at least partially of and/or relating to the feature, structure, characteristic, and/or the like in such a way that presence of minor variations, even variations that might otherwise not be considered fully consistent with the feature, structure, characteristic, and/or the like, do not in general prevent the feature, structure, characteristic, and/or the like from being of a "type" and/or being "like," (such as being an "optical-type" or being "optical-like," for example) if the minor variations are sufficiently minor so that the feature, structure, characteristic, and/or the like would still be considered to be predominantly present with such variations also present. Thus, continuing with this example, the terms optical-type and/or optical-like properties are necessarily intended to include optical properties. Likewise, the terms electrical-type and/or electrical-like properties, as another example, are necessarily intended to include electrical properties. It should be noted that the specification of the present disclosure merely provides one or more illustrative examples and claimed subject matter is intended to not be limited to one or more illustrative examples; however, again, as has always been the case with respect to the specification of a patent application, particular context of description and/or usage provides helpful guidance regarding reasonable inferences to be drawn.

With advances in technology, it has become more typical to employ distributed computing and/or communication approaches in which portions of a process, such as signal processing of signal samples, for example, may be allocated among various devices, including one or more client devices, one or more server devices and/or one or more peer-to-peer devices, via a computing and/or communications network, for example. A network may comprise two or more devices, such as network devices and/or computing devices, and/or may couple devices, such as network devices and/or computing devices, so that signal communications, such as in the form of signal packets and/or signal frames (e.g., comprising one or more signal samples), for example, may be exchanged, such as between a server device, a client device and/or a peer-to-peer device, as well as other types of devices, including between wired and/or wireless devices coupled via a wired and/or wireless network, for example.

An example of a distributed computing system comprises the so-called Hadoop distributed computing system, which employs a map-reduce type of architecture. In the context of the present disclosure, the terms map-reduce architecture and/or similar terms are intended to refer to a distributed computing system implementation and/or embodiment for processing and/or for generating larger sets of signal samples employing map and/or reduce operations for a parallel, distributed process performed over a network of devices. A map operation and/or similar terms refer to processing of signals (e.g., signal samples) to generate one or more key-value pairs and to distribute the one or more pairs to one or more devices of the system (e.g., network). A reduce operation and/or similar terms refer to processing of signals (e.g., signal samples) via a summary operation (e.g., such as counting the number of students in a queue, yielding name frequencies, etc.). A system may employ such an architecture, such as by marshaling distributed server devices, executing various tasks in parallel, and/or managing communications, such as signal transfers, between various parts of the system (e.g., network), in an embodiment. As mentioned, one non-limiting, but well-known, example comprises the Hadoop distributed computing system. It refers to an open source implementation and/or embodiment of a map-reduce type architecture (available from the Apache Software Foundation, 1901 Munsey Drive, Forrest Hill, Md., 21050-2747), but may include other aspects, such as the Hadoop distributed file system (HDFS) (available from the Apache Software Foundation, 1901 Munsey Drive, Forrest Hill, Md., 21050-2747). In general, therefore, "Hadoop" and/or similar terms (e.g., "Hadoop-type," etc.) refer to an implementation and/or embodiment of a scheduler for executing larger processing jobs using a map-reduce architecture over a distributed system. Furthermore, in the context of the present disclosure, use of the term "Hadoop" is intended to include versions, presently known and/or to be later developed.

In the context of the present disclosure, the term network device refers to any device capable of communicating via and/or as part of a network and may comprise a computing device. While network devices may be capable of communicating signals (e.g., signal packets and/or frames), such as via a wired and/or wireless network, they may also be capable of performing operations associated with a computing device, such as arithmetic and/or logic operations, processing and/or storing operations (e.g., storing signal samples), such as in a non-transitory memory as tangible, physical memory states, and/or may, for example, operate as a server device and/or a client device in various embodiments. Network devices capable of operating as a server device, a client device and/or otherwise, may include, as examples, dedicated rack-mounted servers, desktop computers, laptop computers, set top boxes, tablets, netbooks, smart phones, wearable devices, integrated devices combining two or more features of the foregoing devices, and/or the like, or any combination thereof. As mentioned, signal packets and/or frames, for example, may be exchanged, such as between a server device and/or a client device, as well as other types of devices, including between wired and/or wireless devices coupled via a wired and/or wireless network, for example, or any combination thereof. It is noted that the terms, server, server device, server computing device, server computing platform and/or similar terms are used interchangeably. Similarly, the terms client, client device, client computing device, client computing platform and/or similar terms are also used interchangeably. While in some instances, for ease of description, these terms may be used in the singular, such as by referring to a "client device" or a "server device," the description is intended to encompass one or more client devices and/or one or more server devices, as appropriate. Along similar lines, references to a "database" are understood to mean, one or more databases and/or portions thereof, as appropriate.

It should be understood that for ease of description, a network device (also referred to as a networking device) may be embodied and/or described in terms of a computing device and vice-versa. However, it should further be understood that this description should in no way be construed so that claimed subject matter is limited to one embodiment, such as only a computing device and/or only a network device, but, instead, may be embodied as a variety of devices or combinations thereof, including, for example, one or more illustrative examples.

A network may also include now known, and/or to be later developed arrangements, derivatives, and/or improvements, including, for example, past, present and/or future mass storage, such as network attached storage (NAS), a storage area network (SAN), and/or other forms of device readable media, for example. A network may include a portion of the Internet, one or more local area networks (LANs), one or more wide area networks (WANs), wire-line type connections, wireless type connections, other connections, or any combination thereof. Thus, a network may be worldwide in scope and/or extent. Likewise, sub-networks, such as may employ differing architectures and/or may be substantially compliant and/or substantially compatible with differing protocols, such as network computing and/or communications protocols (e.g., network protocols), may interoperate within a larger network.

In the context of the present disclosure, the term sub-network and/or similar terms, if used, for example, with respect to a network, refers to the network and/or a part thereof. Sub-networks may also comprise links, such as physical links, connecting and/or coupling nodes, so as to be capable to communicate signal packets and/or frames between devices of particular nodes, including via wired links, wireless links, or combinations thereof. Various types of devices, such as network devices and/or computing devices, may be made available so that device interoperability is enabled and/or, in at least some instances, may be transparent. In the context of the present disclosure, the term "transparent," if used with respect to particular communicating devices of a network, refers to the devices communicating via the network in which the devices are able to communicate via one or more intermediate devices, such as of one or more intermediate nodes, but without the communicating devices necessarily specifying the one or more intermediate nodes and/or the one or more intermediate devices of the one or more intermediate nodes. Thus, a network may include the one or more intermediate nodes and/or the one or more intermediate devices of the one or more intermediate nodes in communications and the network may engage in communications via the one or more intermediate nodes and/or the one or more intermediate devices of the one or more intermediate nodes, but the network may operate as if such intermediate nodes and/or intermediate devices are not necessarily involved in communications between the particular communicating devices. For example, a router may provide a link and/or connection between otherwise separate and/or independent LANs.

In the context of the present disclosure, a "private network" refers to a particular, limited set of devices, such as network devices and/or computing devices, able to communicate with other devices, such as network devices and/or computing devices, in the particular, limited set, such as via signal packet and/or signal frame communications, for example, without a need for re-routing and/or redirecting signal communications. A private network may comprise a stand-alone network; however, a private network may also comprise a subset of a larger network, such as, for example, without limitation, all or a portion of the Internet. Thus, for example, a private network "in the cloud" may refer to a private network that comprises a subset of the Internet. Although signal packet and/or frame communications (e.g. signal communications) may employ intermediate devices of intermediate nodes to exchange signal packets and/or signal frames, those intermediate devices may not necessarily be included in the private network by not being a source or designated destination for one or more signal packets and/or signal frames, for example. It is understood in the context of the present disclosure that a private network may direct outgoing signal communications to devices not in the private network, but devices outside the private network may not necessarily be able to direct inbound signal communications to devices included in the private network.

The Internet refers to a decentralized global network of interoperable networks that comply with the Internet Protocol (IP). It is noted that there are several versions of the Internet Protocol. The term Internet Protocol, IP, and/or similar terms are intended to refer to any version, now known and/or to be later developed. The Internet includes local area networks (LANs), wide area networks (WANs), wireless networks, and/or long haul networks that, for example, may allow signal packets and/or frames to be communicated between LANs. The term World Wide Web (WWW or Web) and/or similar terms may also be used, although it refers to a part of the Internet that complies with the Hypertext Transfer Protocol (HTTP). For example, network devices may engage in an HTTP session through an exchange of appropriately substantially compatible and/or substantially compliant signal packets and/or frames. It is noted that there are several versions of the Hypertext Transfer Protocol. The term Hypertext Transfer Protocol, HTTP, and/or similar terms are intended to refer to any version, now known and/or to be later developed. It is likewise noted that in various places in this document substitution of the term Internet with the term World Wide Web ("Web") may be made without a significant departure in meaning and may, therefore, also be understood in that manner if the statement would remain correct with such a substitution.

Although claimed subject matter is not in particular limited in scope to the Internet and/or to the Web; nonetheless, the Internet and/or the Web may without limitation provide a useful example of an embodiment at least for purposes of illustration. As indicated, the Internet and/or the Web may comprise a worldwide system of interoperable networks, including interoperable devices within those networks. The Internet and/or Web has evolved to a self-sustaining facility accessible to potentially billions of people or more worldwide. Also, in an embodiment, and as mentioned above, the terms "WWW" and/or "Web" refer to a part of the Internet that complies with the Hypertext Transfer Protocol. The Internet and/or the Web, therefore, in the context of the present disclosure, may comprise a service that organizes stored digital content, such as, for example, text, images, video, etc., through the use of hypermedia, for example, and which may be interconnected using a "hyperlink" or link pointer. It is noted that a network, such as the Internet and/or Web, may be employed to store electronic files and/or electronic documents.

The term electronic file and/or the term electronic document are used throughout this document to refer to a set of stored memory states and/or a set of physical signals associated in a manner so as to thereby at least logically form a file (e.g., electronic) and/or an electronic document. That is, it is not meant to implicitly reference a particular syntax, format and/or approach used, for example, with respect to a set of associated memory states and/or a set of associated physical signals. If a particular type of file storage format and/or syntax, for example, is intended, it is referenced expressly. It is further noted an association of memory states, for example, may be in a logical sense and not necessarily in a tangible, physical sense. Thus, although signal and/or state components of a file and/or an electronic document, for example, are to be associated logically, storage thereof, for example, may reside in one or more different places in a tangible, physical memory, in an embodiment.

A Hyper Text Markup Language ("HTML"), for example, may be utilized to specify digital content and/or to specify a format thereof, such as in the form of an electronic file and/or an electronic document, such as a Web page, Web site, etc., for example. An Extensible Markup Language ("XML") may also be utilized to specify digital content and/or to specify a format thereof, such as in the form of an electronic file and/or an electronic document, such as a Web page, Web site, etc., in an embodiment. Of course, HTML and/or XML are merely examples of "markup" languages, provided as non-limiting illustrations. Furthermore, HTML and/or XML are intended to refer to any version, now known and/or to be later developed, of these languages. Likewise, claimed subject matter are not intended to be limited to examples provided as illustrations, of course.

In the context of the present disclosure, the term "Web site" and/or similar terms refer to Web pages that are associated electronically, such as using one or more hyperlinks, to form a particular collection thereof. Also, in the context of the present disclosure, "Web page" and/or similar terms refer to an electronic file and/or an electronic document accessible via a network, including by specifying a uniform resource locator (URL) for accessibility via the Web, in an example embodiment. As alluded to above, in one or more embodiments, a Web page may comprise digital content coded (e.g., via computer instructions) using one or more languages, such as, for example, markup languages, including HTML and/or XML, although claimed subject matter is not limited in scope in this respect. Also, in one or more embodiments, application developers may write code (e.g., computer instructions) in the form of JavaScript (or other programming languages), for example, executable by a computing device to provide digital content to populate an electronic document and/or an electronic file in an appropriate format, such as for use in a particular application, for example. Use of the term "JavaScript" and/or similar terms intended to refer to one or more particular programming languages are intended to refer to any version of the one or more programming languages identified, now known and/or to be later developed. Thus, JavaScript is merely an example programming language. As was mentioned, claimed subject matter is not intended to be limited to examples and/or illustrations.

In the context of the present disclosure, the terms "entry," "electronic entry," "document," "electronic document," "content,", "digital content," "item," and/or similar terms are meant to refer to signals and/or states in a physical format, such as a digital signal and/or digital state format, e.g., that may be perceived by a user if displayed, played, tactilely generated, etc. and/or otherwise executed by a device, such as a digital device, including, for example, a computing device, but otherwise might not necessarily be readily perceivable by humans (e.g., if in a digital format). Likewise, in the context of the present disclosure, digital content provided to a user in a form so that the user is able to readily perceive the underlying content itself (e.g., content presented in a form consumable by a human, such as hearing audio, feeling tactile sensations and/or seeing images, as examples) is referred to, with respect to the user, as "consuming" digital content, "consumption" of digital content, "consumable" digital content and/or similar terms. For one or more embodiments, an electronic document and/or an electronic file may comprise a Web page of code (e.g., computer instructions) in a markup language executed or to be executed by a computing and/or networking device, for example. In another embodiment, an electronic document and/or electronic file may comprise a portion and/or a region of a Web page. However, claimed subject matter is not intended to be limited in these respects.

Also, for one or more embodiments, an electronic document and/or electronic file may comprise a number of components. As previously indicated, in the context of the present disclosure, a component is physical, but is not necessarily tangible. As an example, components with reference to an electronic document and/or electronic file, in one or more embodiments, may comprise text, for example, in the form of physical signals and/or physical states (e.g., capable of being physically displayed and/or maintained as a memory state in a tangible memory). Typically, memory states, for example, comprise tangible components, whereas physical signals are not necessarily tangible, although signals may become (e.g., be made) tangible, such as if appearing on a tangible display, for example, as is not uncommon. Also, for one or more embodiments, components with reference to an electronic document and/or electronic file may comprise a graphical object, such as, for example, an image, such as a digital image, and/or sub-objects, including attributes thereof, which, again, comprise physical signals and/or physical states (e.g., capable of being tangibly displayed and/or maintained as a memory state in a tangible memory). In an embodiment, digital content may comprise, for example, text, images, audio, video, haptic content and/or other types of electronic documents and/or electronic files, including portions thereof, for example.

Signal packet communications and/or signal frame communications, also referred to as signal packet transmissions and/or signal frame transmissions (or merely "signal packets" or "signal frames"), may be communicated between nodes of a network, where a node may comprise one or more network devices and/or one or more computing devices, for example. As an illustrative example, but without limitation, a node may comprise one or more sites employing a local network address, such as in a local network address space. Likewise, a device, such as a network device and/or a computing device, may be associated with that node. It is also noted that in the context of this disclosure, the term "transmission" is intended as another term for a type of signal communication that may occur in any one of a variety of situations. Thus, it is not intended to imply a particular directionality of communication and/or a particular initiating end of a communication path for the "transmission" communication. For example, the mere use of the term in and of itself is not intended, in the context of the present disclosure, to have particular implications with respect to the one or more signals being communicated, such as, for example, whether the signals are being communicated "to" a particular device, whether the signals are being communicated "from" a particular device, and/or regarding which end of a communication path may be initiating communication, such as, for example, in a "push type" of signal transfer or in a "pull type" of signal transfer. In the context of the present disclosure, push and/or pull type signal transfers are distinguished by which end of a communications path initiates signal transfer.

Thus, a signal packet and/or frame may, as an example, be communicated via a communication channel and/or a communication path, such as comprising a portion of the Internet and/or the Web, from a site via an access node coupled to the Internet or vice-versa. Likewise, a signal packet and/or frame may be forwarded via network nodes to a target site coupled to a local network, for example. A signal packet and/or frame communicated via the Internet and/or the Web, for example, may be routed via a path, such as either being "pushed" or "pulled," comprising one or more gateways, servers, etc. that may, for example, route a signal packet and/or frame, such as, for example, substantially in accordance with a target and/or destination address and availability of a network path of network nodes to the target and/or destination address. Although the Internet and/or the Web comprise a network of interoperable networks, not all of those interoperable networks are necessarily available and/or accessible to the public.

In the context of the particular disclosure, a network protocol, such as for communicating between devices of a network, may be characterized, at least in part, substantially in accordance with a layered description, such as the so-called Open Systems Interconnection (OSI) seven layer type of approach and/or description. A network computing and/or communications protocol (also referred to as a network protocol) refers to a set of signaling conventions, such as for communication transmissions, for example, as may take place between and/or among devices in a network. In the context of the present disclosure, the term "between" and/or similar terms are understood to include "among" if appropriate for the particular usage and vice-versa. Likewise, in the context of the present disclosure, the terms "compatible with," "comply with" and/or similar terms are understood to respectively include substantial compatibility and/or substantial compliance.

A network protocol, such as protocols characterized substantially in accordance with the aforementioned OSI description, has several layers. These layers are referred to as a network stack. Various types of communications (e.g., transmissions), such as network communications, may occur across various layers. A lowest level layer in a network stack, such as the so-called physical layer, may characterize how symbols (e.g., bits and/or bytes) are communicated as one or more signals (and/or signal samples) via a physical medium (e.g., twisted pair copper wire, coaxial cable, fiber optic cable, wireless air interface, combinations thereof, etc.). Progressing to higher-level layers in a network protocol stack, additional operations and/or features may be available via engaging in communications that are substantially compatible and/or substantially compliant with a particular network protocol at these higher-level layers. For example, higher-level layers of a network protocol may, for example, affect device permissions, user permissions, etc.

A network and/or sub-network, in an embodiment, may communicate via signal packets and/or signal frames, such via participating digital devices and may be substantially compliant and/or substantially compatible with, but is not limited to, now known and/or to be developed, versions of any of the following network protocol stacks: ARCNET, AppleTalk, ATM, Bluetooth, DECnet, Ethernet, FDDI, Frame Relay, HIPPI, IEEE 1394, IEEE 802.11, IEEE-488, Internet Protocol Suite, IPX, Myrinet, OSI Protocol Suite, QsNet, RS-232, SPX, System Network Architecture, Token Ring, USB, and/or X.25. A network and/or sub-network may employ, for example, a version, now known and/or later to be developed, of the following: TCP/IP, UDP, DECnet, NetBEUI, IPX, AppleTalk and/or the like. Versions of the Internet Protocol (IP) may include IPv4, IPv6, and/or other later to be developed versions.

Regarding aspects related to a network, including a communications and/or computing network, a wireless network may couple devices, including client devices, with the network. A wireless network may employ stand-alone, ad-hoc networks, mesh networks, Wireless LAN (WLAN) networks, cellular networks, and/or the like. A wireless network may further include a system of terminals, gateways, routers, and/or the like coupled by wireless radio links, and/or the like, which may move freely, randomly and/or organize themselves arbitrarily, such that network topology may change, at times even rapidly. A wireless network may further employ a plurality of network access technologies, including a version of Long Term Evolution (LTE), WLAN, Wireless Router (WR) mesh, 2nd, 3rd, or 4th generation (2G, 3G, or 4G) cellular technology and/or the like, whether currently known and/or to be later developed. Network access technologies may enable wide area coverage for devices, such as computing devices and/or network devices, with varying degrees of mobility, for example.

A network may enable radio frequency and/or other wireless type communications via a wireless network access technology and/or air interface, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, ultra-wideband (UWB), IEEE 802.11 (including, but not limited to, IEEE 802.11b/g/n), and/or the like. A wireless network may include virtually any type of now known and/or to be developed wireless communication mechanism and/or wireless communications protocol by which signals may be communicated between devices, between networks, within a network, and/or the like, including the foregoing, of course.

Figure 8:
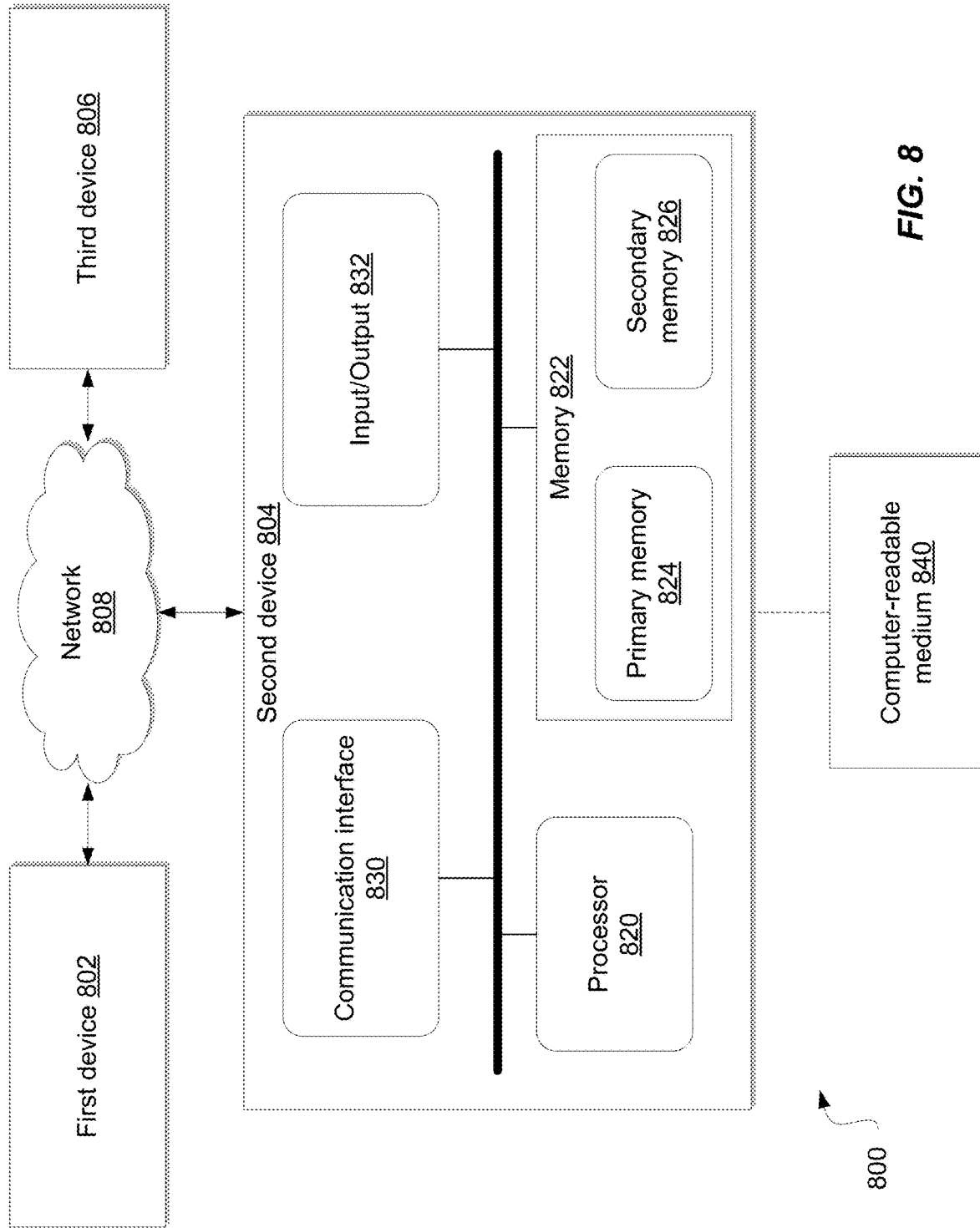
FIG. 8 is an illustration of an embodiment of a system in a networking and/or computing environment.

In one example embodiment, as shown in FIG. 8, a system embodiment may comprise a local network (e.g., device 804 and medium 840) and/or another type of network, such as a computing and/or communications network. For purposes of illustration, therefore, FIG. 8 shows an embodiment 800 of a system that may be employed to implement either type or both types of networks. Network 808 may comprise one or more network connections, links, processes, services, applications, and/or resources to facilitate and/or support communications, such as an exchange of communication signals, for example, between a computing device, such as 802, and another computing device, such as 806, which may, for example, comprise one or more client computing devices and/or one or more server computing device. By way of example, but not limitation, network 808 may comprise wireless and/or wired communication links, telephone and/or telecommunications systems, Wi-Fi networks, Wi-MAX networks, the Internet, a local area network (LAN), a wide area network (WAN), or any combinations thereof.

Example devices in FIG. 8 may comprise features, for example, of a client computing device and/or a server computing device, in an embodiment. It is further noted that the term computing device, in general, whether employed as a client and/or as a server, or otherwise, refers at least to a processor and a memory connected by a communication bus. Likewise, in the context of the present disclosure at least, this is understood to refer to sufficient structure within the meaning of 35 § USC 112(f) so that it is specifically intended that 35 § USC 112(f) not be implicated by use of the term "computing device" and/or similar terms; however, if it is determined, for some reason not immediately apparent, that the foregoing understanding cannot stand and that 35 § USC 112 (f) therefore, necessarily is implicated by the use of the term "computing device" and/or similar terms, then, it is intended, pursuant to that statutory section, that corresponding structure, material and/or acts for performing one or more functions be understood and be interpreted to be described at least FIGS. 1 and 2 and in the paragraphs associated with the discussion thereof.

Referring now to FIG. 8, in an embodiment, first and third devices 802 and 806 may be capable of rendering a graphical user interface (GUI) for a network device and/or a computing device, for example, so that a user-operator may engage in system use. Device 804 may potentially serve a similar function in this illustration. Likewise, in FIG. 8, computing device 802 ('first device' in figure) may interface with computing device 804 ('second device' in figure), which may, for example, also comprise features of a client computing device and/or a server computing device, in an embodiment. Processor (e.g., processing device) 820 and memory 822, which may comprise primary memory 824 and secondary memory 826, may communicate by way of a communication bus 215, for example. The term "computing device," in the context of the present disclosure, refers to a system and/or a device, such as a computing apparatus, that includes a capability to process (e.g., perform computations) and/or store digital content, such as electronic files, electronic documents, measurements, text, images, video, audio, etc. in the form of signals and/or states. Thus, a computing device, in the context of the present disclosure, may comprise hardware, software, firmware, or any combination thereof (other than software per se). Computing device 804, as depicted in FIG. 8, is merely one example, and claimed subject matter is not limited in scope to this particular example.

For one or more embodiments, a computing device may comprise, for example, any of a wide range of digital electronic devices, including, but not limited to, desktop and/or notebook computers, high-definition televisions, digital versatile disc (DVD) and/or other optical disc players and/or recorders, game consoles, satellite television receivers, cellular telephones, tablet devices, wearable devices, personal digital assistants, mobile audio and/or video playback and/or recording devices, or any combination of the foregoing. Further, unless specifically stated otherwise, a process as described, such as with reference to flow diagrams and/or otherwise, may also be executed and/or affected, in whole or in part, by a computing device and/or a network device. A device, such as a computing device and/or network device, may vary in terms of capabilities and/or features. Claimed subject matter is intended to cover a wide range of potential variations. For example, a device may include a numeric keypad and/or other display of limited functionality, such as a monochrome liquid crystal display (LCD) for displaying text, for example. In contrast, however, as another example, a web-enabled device may include a physical and/or a virtual keyboard, mass storage, one or more accelerometers, one or more gyroscopes, global positioning system (GPS) and/or other location-identifying type capability, and/or a display with a higher degree of functionality, such as a touch-sensitive color 2D or 3D display, for example.

As suggested previously, communications between a computing device and/or a network device and a wireless network may be in accordance with known and/or to be developed network protocols including, for example, global system for mobile communications (GSM), enhanced data rate for GSM evolution (EDGE), 802.11b/g/n/h, etc., and/or worldwide interoperability for microwave access (WiMAX). A computing device and/or a networking device may also have a subscriber identity module (SIM) card, which, for example, may comprise a detachable or embedded smart card that is able to store subscription content of a user, and/or is also able to store a contact list. A user may own the computing device and/or network device or may otherwise be a user, such as a primary user, for example. A device may be assigned an address by a wireless network operator, a wired network operator, and/or an Internet Service Provider (ISP). For example, an address may comprise a domestic or international telephone number, an Internet Protocol (IP) address, and/or one or more other identifiers. In other embodiments, a computing and/or communications network may be embodied as a wired network, wireless network, or any combinations thereof.

A computing and/or network device may include and/or may execute a variety of now known and/or to be developed operating systems, derivatives and/or versions thereof, including computer operating systems, such as Windows, OSX, Linux, a mobile operating system, such as iOS, Android, Windows Mobile, and/or the like. A computing device and/or network device may include and/or may execute a variety of possible applications, such as a client software application enabling communication with other devices. For example, one or more messages (e.g., content) may be communicated, such as via one or more protocols, now known and/or later to be developed, suitable for communication of email, short message service (SMS), and/or multimedia message service (MMS), including via a network, such as a social network, formed at least in part by a portion of a computing and/or communications network, including, but not limited to, Facebook, LinkedIn, Twitter, Flickr, and/or Google+, to provide only a few examples. A computing and/or network device may also include executable computer instructions to process and/or communicate digital content, such as, for example, textual content, digital multimedia content, and/or the like. A computing and/or network device may also include executable computer instructions to perform a variety of possible tasks, such as browsing, searching, playing various forms of digital content, including locally stored and/or streamed video, and/or games such as, but not limited to, fantasy sports leagues. The foregoing is provided merely to illustrate that claimed subject matter is intended to include a wide range of possible features and/or capabilities.

In FIG. 8, computing device 802 may provide one or more sources of executable computer instructions in the form physical states and/or signals (e.g., stored in memory states), for example. Computing device 802 may communicate with computing device 804 by way of a network connection, such as via network 808, for example. As previously mentioned, a connection, while physical, may not necessarily be tangible. Although computing device 804 of FIG. 8 shows various tangible, physical components, claimed subject matter is not limited to a computing devices having only these tangible components as other implementations and/or embodiments may include alternative arrangements that may comprise additional tangible components or fewer tangible components, for example, that function differently while achieving similar results. Rather, examples are provided merely as illustrations. It is not intended that claimed subject matter be limited in scope to illustrative examples.

Memory 822 may comprise any non-transitory storage mechanism. Memory 822 may comprise, for example, primary memory 824 and secondary memory 826, additional memory circuits, mechanisms, or combinations thereof may be used. Memory 822 may comprise, for example, random access memory, read only memory, etc., such as in the form of one or more storage devices and/or systems, such as, for example, a disk drive including an optical disc drive, a tape drive, a solid-state memory drive, etc., just to name a few examples.

Memory 822 may be utilized to store a program of executable computer instructions. For example, processor 820 may fetch executable instructions from memory and proceed to execute the fetched instructions. Memory 822 may also comprise a memory controller for accessing device readable-medium 840 that may carry and/or make accessible digital content, which may include code, and/or instructions, for example, executable by processor 820 and/or some other device, such as a controller, as one example, capable of executing computer instructions, for example. Under direction of processor 820, a non-transitory memory, such as memory cells storing physical states (e.g., memory states), comprising, for example, a program of executable computer instructions, may be executed by processor 820 and able to generate signals to be communicated via a network, for example, as previously described. Generated signals may also be stored in memory, also previously suggested.

Memory 822 may store electronic files and/or electronic documents, such as relating to one or more users, and may also comprise a device-readable medium that may carry and/or make accessible content, including code and/or instructions, for example, executable by processor 820 and/or some other device, such as a controller, as one example, capable of executing computer instructions, for example. As previously mentioned, the term electronic file and/or the term electronic document are used throughout this document to refer to a set of stored memory states and/or a set of physical signals associated in a manner so as to thereby form an electronic file and/or an electronic document. That is, it is not meant to implicitly reference a particular syntax, format and/or approach used, for example, with respect to a set of associated memory states and/or a set of associated physical signals. It is further noted an association of memory states, for example, may be in a logical sense and not necessarily in a tangible, physical sense. Thus, although signal and/or state components of an electronic file and/or electronic document, are to be associated logically, storage thereof, for example, may reside in one or more different places in a tangible, physical memory, in an embodiment.

Algorithmic descriptions and/or symbolic representations are examples of techniques used by those of ordinary skill in the signal processing and/or related arts to convey the substance of their work to others skilled in the art. An algorithm is, in the context of the present disclosure, and generally, is considered to be a self-consistent sequence of operations and/or similar signal processing leading to a desired result. In the context of the present disclosure, operations and/or processing involve physical manipulation of physical quantities. Typically, although not necessarily, such quantities may take the form of electrical and/or magnetic signals and/or states capable of being stored, transferred, combined, compared, processed and/or otherwise manipulated, for example, as electronic signals and/or states making up components of various forms of digital content, such as signal measurements, text, images, video, audio, etc.

It has proven convenient at times, principally for reasons of common usage, to refer to such physical signals and/or physical states as bits, values, elements, parameters, symbols, characters, terms, numbers, numerals, measurements, content and/or the like. It should be understood, however, that all of these and/or similar terms are to be associated with appropriate physical quantities and are merely convenient labels. Unless specifically stated otherwise, as apparent from the preceding discussion, it is appreciated that throughout this specification discussions utilizing terms such as "processing," "computing," "calculating," "determining," "establishing," "obtaining," "identifying," "selecting," "generating," and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically in the form of physical electronic and/or magnetic quantities, within memories, registers, and/or other storage devices, processing devices, and/or display devices of the special purpose computer and/or similar special purpose computing and/or network device. In the context of this particular disclosure, as mentioned, the term "specific apparatus" therefore includes a general purpose computing and/or network device, such as a general purpose computer, once it is programmed to perform particular functions, such as pursuant to program software instructions.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation. Likewise, a physical change may comprise a transformation in molecular structure, such as from crystalline form to amorphous form or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state from a binary one to a binary zero or vice-versa in a memory device may comprise a transformation, such as a physical, but non-transitory, transformation. Rather, the foregoing is intended as illustrative examples.

Referring again to FIG. 8, processor 820 may comprise one or more circuits, such as digital circuits, to perform at least a portion of a computing procedure and/or process. By way of example, but not limitation, processor 820 may comprise one or more processors, such as controllers, microprocessors, microcontrollers, application specific integrated circuits, digital signal processors, programmable logic devices, field programmable gate arrays, the like, or any combination thereof. In various implementations and/or embodiments, processor 820 may perform signal processing, typically substantially in accordance with fetched executable computer instructions, such as to manipulate signals and/or states, to construct signals and/or states, etc., with signals and/or states generated in such a manner to be communicated and/or stored in memory, for example.

FIG. 8 also illustrates device 804 as including a component 832 operable with input/output devices, for example, so that signals and/or states may be appropriately communicated between devices, such as device 804 and an input device and/or device 804 and an output device. A user may make use of an input device, such as a computer mouse, stylus, track ball, keyboard, and/or any other similar device capable of receiving user actions and/or motions as input signals. Likewise, a user may make use of an output device, such as a display, a printer, etc., and/or any other device capable of providing signals and/or generating stimuli for a user, such as visual stimuli, audio stimuli and/or other similar stimuli.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

What is claimed is:

1. A method, comprising:
   evaluating content of a landing page of an advertisement, to which a user is at least one of directed or re-directed responsive to selecting the advertisement, to identify features of the landing page of the advertisement;
   predicting a machine learning (ML) classification of the landing page of the advertisement as to post-click user experience based upon the features; and
   determining one or more adjustments to one or more features of the landing page of the advertisement to change the ML classification of the landing page of the advertisement, wherein the one or more adjustments to the one or more features are associated with transforming the landing page of the advertisement into a transformed landing page of the advertisement associated with a higher quality than the landing page of the advertisement, wherein the transformed landing page of the advertisement corresponds to digital content for delivery to a plurality of user computing devices.

2. The method of claim 1, comprising:
   determining a cost function measuring effort for transforming a first quality landing page into a second quality landing page, wherein the first quality landing page is associated with a lower quality than the second quality landing page, wherein the determining the one or more adjustments is based upon the cost function.

3. The method of claim 1, wherein the evaluating the content of the landing page associated with the advertisement to identify the features of the landing page comprises:
   determining a first feature of the landing page based upon a language style associated with textual content of the landing page.

4. The method of claim 1, wherein the evaluating the content of the landing page associated with the advertisement to identify the features of the landing page comprises:
   determining a first feature of the landing page based upon one or more HyperText Markup Language (HTML) Document Object Model (DOM) elements of the landing page.

5. The method of claim 1, wherein the evaluating the content of the landing page associated with the advertisement to identify the features of the landing page comprises:
   determining a first feature of the landing page based upon readability associated with textual content of the landing page.

6. The method of claim 1, wherein the evaluating the content of the landing page associated with the advertisement to identify the features of the landing page comprises:
   determining a first feature of the landing page based upon a determination of whether the landing page is mobile-optimized.

7. The method of claim 1, wherein the evaluating the content of the landing page associated with the advertisement to identify the features of the landing page comprises:
   determining a first feature of the landing page based upon one or more characteristics of multimedia content of the landing page.

8. The method of claim 1, wherein the evaluating the content of the landing page associated with the advertisement to identify the features of the landing page comprises:
   determining a first feature of the landing page based upon a number of input element types in the landing page.

9. The method of claim 1, wherein the evaluating the content of the landing page associated with the advertisement to identify the features of the landing page comprises:

determining a first feature of the landing page based upon a similarity between the advertisement and the landing page.

10. A system, comprising:
a processor; and
memory comprising processor-executable instructions that when executed by the processor cause performance of operations, the operations comprising:
evaluating content of a landing page of an advertisement, to which a user is at least one of directed or re-directed responsive to selecting the advertisement, to identify features of the landing page of the advertisement;
predicting a machine learning (ML) classification of the landing page of the advertisement as to post-click user experience based upon the features; and
determining one or more adjustments to one or more features of the landing page of the advertisement to change the ML classification of the landing page of the advertisement, wherein the one or more adjustments to the one or more features are associated with transforming the landing page of the advertisement into a transformed landing page of the advertisement associated with a higher quality than the landing page of the advertisement, wherein the transformed landing page of the advertisement corresponds to digital content for delivery to a plurality of user computing devices.

11. The system of claim 10, the operations comprising:
determining a cost function measuring effort for transforming a first quality landing page into a second quality landing page, wherein the first quality landing page is associated with a lower quality than the second quality landing page, wherein the determining the one or more adjustments is based upon the cost function.

12. The system of claim 10, wherein the evaluating the content of the landing page associated with the advertisement to identify the features of the landing page comprises:
determining a first feature of the landing page based upon a language style associated with textual content of the landing page.

13. The system of claim 10, wherein the evaluating the content of the landing page associated with the advertisement to identify the features of the landing page comprises:
determining a first feature of the landing page based upon one or more HyperText Markup Language (HTML) Document Object Model (DOM) elements of the landing page.

14. The system of claim 10, wherein the evaluating the content of the landing page associated with the advertisement to identify the features of the landing page comprises:
determining a first feature of the landing page based upon readability associated with textual content of the landing page.

15. The system of claim 10, wherein the evaluating the content of the landing page associated with the advertisement to identify the features of the landing page comprises:

determining a first feature of the landing page based upon a determination of whether the landing page is mobile-optimized.

16. The system of claim 10, wherein the evaluating the content of the landing page associated with the advertisement to identify the features of the landing page comprises:
determining a first feature of the landing page based upon one or more characteristics of multimedia content of the landing page.

17. The system of claim 10, wherein the evaluating the content of the landing page associated with the advertisement to identify the features of the landing page comprises:
determining a first feature of the landing page based upon a number of input element types in the landing page.

18. The system of claim 10, wherein the evaluating the content of the landing page associated with the advertisement to identify the features of the landing page comprises:
determining a first feature of the landing page based upon a similarity between the advertisement and the landing page.

19. A device readable medium having stored thereon processor-executable instructions that when executed cause performance of operations, the operations comprising:
evaluating content of a landing page of an advertisement, to which a user is at least one of directed or re-directed responsive to selecting the advertisement, to identify features of the landing page of the advertisement;
predicting a classification of the landing page of the advertisement as to post-click user experience based upon the features; and
determining one or more adjustments to one or more features of the landing page of the advertisement to change the classification of the landing page of the advertisement, wherein the one or more adjustments to the one or more features are associated with transforming the landing page of the advertisement into a transformed landing page of the advertisement associated with a higher quality than the landing page of the advertisement.

20. The device readable medium of claim 19, the operations comprising:
determining a cost function measuring effort for transforming a first quality landing page into a second quality landing page, wherein the first quality landing page is associated with a lower quality than the second quality landing page, wherein the determining the one or more adjustments is based upon the cost function.

21. The device readable medium of claim 19, wherein the evaluating the content of the landing page associated with the advertisement to identify the features of the landing page comprises:
determining a first feature of the landing page based upon a language style associated with textual content of the landing page.

* * * * *